(12) United States Patent
Lim

(10) Patent No.: US 12,342,772 B2
(45) Date of Patent: Jul. 1, 2025

(54) PLANT CULTIVATION APPARATUS

(71) Applicant: LG Electronics Inc., Seoul (KR)

(72) Inventor: Kiyoung Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 169 days.

(21) Appl. No.: 17/791,179

(22) PCT Filed: Dec. 18, 2020

(86) PCT No.: PCT/KR2020/018696
§ 371 (c)(1),
(2) Date: Jul. 6, 2022

(87) PCT Pub. No.: WO2021/141279
PCT Pub. Date: Jul. 15, 2021

(65) Prior Publication Data
US 2023/0033427 A1      Feb. 2, 2023

(30) Foreign Application Priority Data

Jan. 6, 2020 (KR) .......................... 10-2020-0001634

(51) Int. Cl.
*A01G 9/24*      (2006.01)
(52) U.S. Cl.
CPC .................................. *A01G 9/246* (2013.01)
(58) Field of Classification Search
CPC ................................................... A01G 9/246
See application file for complete search history.

(56) References Cited

U.S. PATENT DOCUMENTS

| 7,234,270 B2 * | 6/2007 | Brault | A01G 9/246 |
| | | | 52/63 |
| 10,806,100 B1 * | 10/2020 | Trtilek | A01G 9/246 |

(Continued)

FOREIGN PATENT DOCUMENTS

| CN | 204311054 | 5/2015 |
| CN | 206909267 | 1/2018 |

(Continued)

OTHER PUBLICATIONS

European Search Report issued in Application No. 20911544.3 dated Dec. 22, 2023.

*Primary Examiner* — Monica L Perry
*Assistant Examiner* — Katherine Anne Kloecker
(74) *Attorney, Agent, or Firm* — KED & ASSOCIATES

(57) ABSTRACT

An apparatus for cultivating plants can include a cabinet including an outer case forming an outer appearance, an inner case forming a cultivation space, and an insulating material disposed in a space between the inner case and the outer case; a door configured to open and close the cultivation space; a temperature adjustment device provided in the cultivation space to adjust a temperature of the cultivation space; a cultivation shelf configured to be disposed in the cultivation space, on which plants for cultivation are disposed; and a suction duct provided between the outer case and the inner case and configured to pass through the insulating material; in which an inlet of the suction duct is connected to the opening of the outer case, and an outlet of the suction duct is connected to the opening of the inner case so that outdoor air flows thereinto.

16 Claims, 26 Drawing Sheets

(56) References Cited

U.S. PATENT DOCUMENTS

| | | | | |
|---|---|---|---|---|
| 2014/0318012 | A1* | 10/2014 | Fujiyama | A01G 9/249 47/62 R |
| 2016/0192601 | A1* | 7/2016 | Kao | A01G 31/02 47/17 |
| 2018/0035994 | A1 | 2/2018 | Loron | |
| 2019/0223391 | A1 | 7/2019 | Loessl et al. | |
| 2021/0105955 | A1* | 4/2021 | Schroeder | A01G 9/246 |
| 2021/0307269 | A1* | 10/2021 | Massey | A01G 31/06 |

FOREIGN PATENT DOCUMENTS

| | | |
|---|---|---|
| CN | 208675900 | 4/2019 |
| JP | 2019129787 | 8/2019 |
| KR | 10-2006-0080008 | 7/2006 |
| KR | 100997722 | 12/2010 |
| KR | 20-2011-0005482 | 6/2011 |
| KR | 20120124536 | 11/2012 |
| KR | 101240375 | 3/2013 |
| KR | 10-2014-0097689 | 8/2014 |
| KR | 101451343 | 10/2014 |
| KR | 101451343 B1 * | 10/2014 |
| KR | 101912856 B1 * | 10/2018 |
| KR | 20190088222 | 7/2019 |

\* cited by examiner

PLANT CULTIVATION APPARATUS

CROSS-REFERENCE TO RELATED APPLICATIONS

This application is a National Stage application under 35 U.S.C. § 371 of International Application No. PCT/KR2020/018696, filed on Dec. 18, 2020, which claims the benefit of Korean Patent Application No. 10-2020-0001634, filed on Jan. 6, 2020. The disclosures of the prior applications are incorporated by reference in their entirety.

TECHNICAL FIELD

The present disclosure relates to an apparatus for cultivating plants.

BACKGROUND ART

In general, an apparatus for cultivating plants includes a predetermined cultivating chamber having an environment appropriate to grow the plants, and the plants are stored in the predetermined cultivating chamber. The apparatus for cultivating plants has components to supply nutrients and light energy required for plant growth, and the plants are grown by the supplied nutrients and light energy.

An apparatus for cultivating plants according to the related art is disclosed in Korean Patent Registration No. 10-1240375. In this related art, a structure is disclosed in which a multi-stage tray is disposed inside a cabinet, light is irradiated from a light irradiation unit to the tray, and the nutrient solution is supplied to the tray through the nutrient solution recovery container, and an inner portion of the cabinet is maintained at a set temperature by the air conditioning unit and the air circulation fan to be capable of cultivating plants.

However, this related art has a structure in which water and nutrient solution are supplied and recovered through the nutrient solution recovery container, and there is a problem of being vulnerable to contamination due to a structure in which the nutrient solution is circulated.

In particular, when used for a long time, the nutrient solution is spoiled or contaminated and in a structure in which the nutrient solution circulates through the nutrient solution recovery container and the entire flow path, there is a problem in that it is inevitably impossible to maintain a sanitary environment.

In addition, a structure for replenishing the nutrient solution and water is not disclosed, and when viewed as a structure in which the flow path is connected, it can be viewed as a structure of a fixed nutrient solution recovery container, and in this case, there is a problem in that water supply management and washing are very inconvenient.

Meanwhile, in US Patent No. 2018/0359946, a structure is disclosed in which a plurality of trays for cultivating plants are provided in an inner portion of the cabinet, and light means irradiating light and water supply means are provided above the tray to supply nutrient solution, and a cooling device and a heating device using a refrigeration cycle are provided to adjust the temperature in the inner portion of the cabinet.

However, in such a structure, there is a problem in that a structure for supplying carbon dioxide for plant growth is not disclosed. In addition, when the inner portion is sealed, there is a problem in that dew condensation occurs in the internal space due to moisture generated by the respiration of plants.

In addition, when a part of the internal space of the cabinet has an open structure to supply carbon dioxide or to prevent dew condensation, there may be a problem in that insects penetrate from the outside and multiply.

DISCLOSURE

Technical Problem

An object of the present disclosure is to provide an apparatus for cultivating plants capable of preventing contamination of a cultivation space and maintaining a sanitary environment at all times.

An object of the present disclosure is to provide an apparatus for cultivating plants that facilitates ventilation of a cultivation space and supply of carbon dioxide while preventing penetration of pests.

An object of the present disclosure is to provide an apparatus for cultivating plants capable of preventing dew condensation inside a cultivation space while maintaining a sealed state of a door.

An object of the present disclosure is to provide an apparatus for cultivating plants disposed so that a ventilation structure is not exposed to a user.

Technical Solution

An apparatus for cultivating plants according to the present embodiment may include a cabinet including an outer case forming an outer appearance, an inner case forming a cultivation space, and an insulating material disposed in a space between the inner case and the outer case; an evaporator provided inside the cultivation space to adjust a temperature of the cultivation space; a door configured to open and close the cultivation space; a cultivation shelf configured to be disposed inside the cultivation space, on which a seed package containing plants for cultivation is seated; a water supply module configured to supply water to the cultivation shelf; a machine room having a separate space formed under the cultivation space; a compressor configured to be disposed in the machine room and to be connected to the evaporator to compress the refrigerant; a heat dissipation fan configured to be disposed in the machine room and configured to dissipate heat generated by the compressor to the outside; a suction duct formed to pass through the insulating material from the upper portion of the cabinet and through which outside air flows therein; and a discharge duct formed to pass through the insulating material from a lower surface of the cabinet to discharge air inside the cultivation space to the machine room.

An exhaust fan may be further provided in the discharge duct, and when the exhaust fan is operated, the air in the cultivation space may be discharged to the outside of the cabinet via the machine room.

The discharge duct vertically may penetrate the lower surface of the cultivation space and the upper surface of the machine room.

The discharge duct may be formed in a cylindrical shape with an open upper surface and an open lower surface, the open upper surface of the discharge duct may communicate with the cultivation space outlet of the bottom of the cultivation space, and the open lower surface of the discharge duct may communicate with the machine room inlet of the upper surface of the machine room.

The discharge duct may be disposed to communicate with the suction side of the heat dissipation fan.

A barrier dividing the machine room into a suction-side space provided with a condenser and a discharge-side space provided with the compressor may be provided inside the machine room, the heat dissipation fan may be mounted on the barrier, and the outlet of the discharge duct may be opened in the suction-side space.

The barrier may extend from the front end to the rear end of the machine room and divide the inside of the machine room into both sides in the left and right direction, and a grill cover through which air is suctioned and discharged may be provided on a front surface of the opened machine room.

The suction duct may be formed to pass through a side surface of the inner case and a rear surface of the outer case so that the outside of the cabinet communicates with the cultivation space.

A cultivation space inlet may be formed on a side surface of the cultivation space corresponding to the outlet of the suction duct, and a pre-filter may be mounted at the inlet of the cultivation space.

An evaporator for cooling the cultivation space may be provided on the rear surface of the cultivation space, and the suction duct may be disposed on the side of the evaporator.

A blower assembly for circulating air inside the cultivation space may be provided in front of the evaporator, and the outlet of the suction duct may be positioned between the evaporator and the blower assembly, and the outside air may flow thereinto through the suction duct by driving the blower assembly.

The suction duct may extend from the rear surface of the cabinet to the front end of the blower assembly; the inlet of the suction duct may be formed on the rear side of the suction duct in contact with the rear surface of the cabinet, and the outlet of the suction duct may be formed on a circumferential surface of the suction duct communicating with the side surface of the cultivation space.

The blower assembly may include a blower fan; a fan guide in which a blower fan is mounted and which guides the air flow from the top to the bottom; and a blower cover provided on the front surface of the fan guide and forming a rear surface of the cultivation space, and in which the outlet of the suction duct may overlap the space between the fan guide and the evaporator.

A gasket may be formed on the rear surface of the door along a position corresponding to the circumference of the front surface of the cabinet, and a space between the cabinet and the door may be airtight by the gasket.

A back plate may be provided on the rear surface of the cabinet, and a plate grill may be formed through the back plate corresponding to the inlet of the suction duct.

Advantageous Effect

The apparatus for cultivating plants according to an embodiment of the present disclosure can expect the following effects.

According to an embodiment of the present disclosure, the cultivation space of the apparatus for cultivating plants may be configured such that external air is suctioned therein by a suction duct, and air in the cultivation space is discharged to the outside through the machine room by a discharge duct.

Therefore, when cultivating plants in the cultivation space, the humidity in the interior of the cultivation space increases due to the transpiration action, thereby preventing the problem that dew condensation is generated therein. In other words, by appropriately ventilating the inner portion of the cultivation space, the humidity of the cultivation space can be constantly maintained.

In addition, there is an advantage in that it is possible to prevent contamination of the inner portion due to excessive moisture, and the inner portion can be maintained in a tidy and clean state.

In addition, there is an advantage in that carbon dioxide necessary for plant growth can be sufficiently secured through external air flowing into the cultivation space without a separate tank or device for supplying carbon dioxide.

In particular, the front surface of the cabinet may be shielded by the door, and the front surface of the cabinet may be airtight by a gasket provided in the door. Accordingly, it is possible to completely block the penetration of external pests between the cabinet and the door. In addition, the cultivation space in which the door is shielded and sealed can be ventilated by the suction duct and the discharge duct that are not directly exposed to the outside.

Meanwhile, the inlet of the suction duct communicates with the rear surface of the cabinet, and the outlet of the discharge duct communicates with the machine room, so that the suction duct, the discharge duct, and related components are not exposed to the outside in a state where the apparatus for cultivating plants is installed, and thus it is possible to prevent deterioration of the outer appearance while improving ventilation performance.

In particular, the discharge duct communicates with the bottom surface of the cultivation space, but the cultivation space outlet is formed in a portion that is shielded by the pump cover, thereby preventing the opening from being exposed to the outside. In addition, the exhaust fan may also be shielded by the pump cover in a state where the exhaust fan is mounted on the outlet of the cultivation space, so that the cultivation space may have a cleaner outer appearance.

In addition, the outlet side of the suction duct may be covered by the blower assembly, thus preventing exposure of the suction duct and related components to further improve the outer appearance of the cultivation space.

In addition, a pre-filter is provided at the inlet of the cultivation space communicating with the outlet of the suction duct, so that it is possible to completely block the penetration of foreign substances and pests through the suction duct.

In addition, the pre-filter is also positioned between the blower assembly and the sidewall of the cultivation space to prevent external exposure. In addition, since the pre-filter is moved in the front and rear direction by the filter guide to be detachable, there is an advantage in that the management and replacement of the pre-filter is easy.

In addition, the outlet of the suction duct may be disposed adjacent to the blower fan, and thus, external air may flow into the cultivation space through the suction duct when the blower fan is driven without a separate suction fan.

In this case, since the cultivation space inlet is positioned on the side of the evaporator, it is possible to dispose the suction duct without interfering with the evaporator. In addition, since the air flowing into the interior of the cultivation space through the suction duct passes through the evaporator, it is possible to prevent the temperature of the interior of the cultivation space from being greatly changed by the suction air.

In addition, an exhaust fan is provided in the discharge duct to discharge the air inside the cultivation space, and effective exhaust may be performed by the exhaust fan even in a situation where it is difficult to relatively effectively flow the air because it is shielded by the pump cover.

In addition, since the outlet of the discharge duct communicates with the suction side of the machine room, that is, the area where the compressor is disposed, air suction inside the discharge duct can be more effectively made when the heat dissipation fan is driven, thus there is an advantage in that the air within the cultivation space is discharged more easily.

BEST MODE

Hereinafter, specific embodiments of the present disclosure will be described in detail with drawings. However, the present disclosure cannot be said to be limited to the embodiments in which the spirit of the present disclosure is presented, and other disclosures that are degenerative by addition, change, deletion, or the like of other components or other embodiments included within the scope of the present disclosure are easily suggested.

Figure 1:
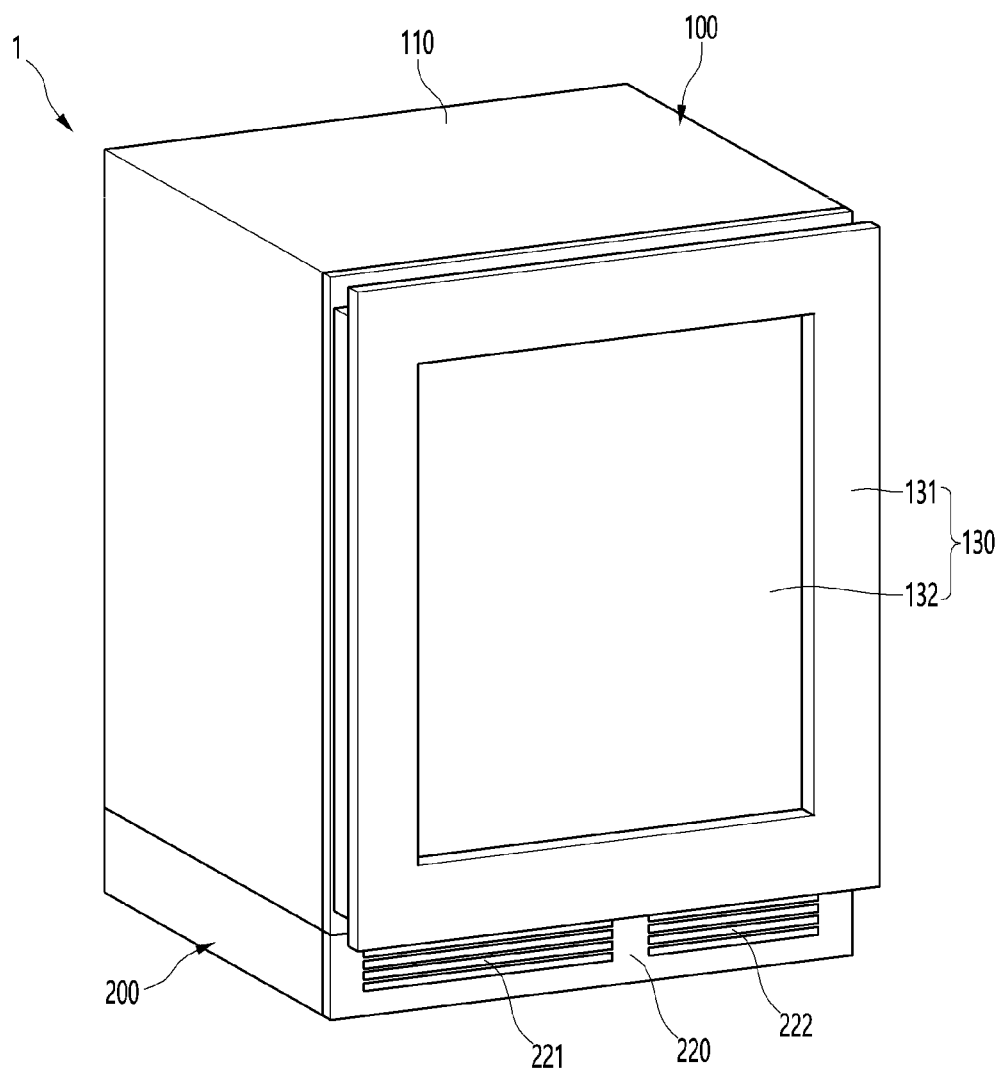
FIG. 1 is a perspective view illustrating an apparatus for cultivating plants according to an embodiment of the present disclosure.
Figure 2:
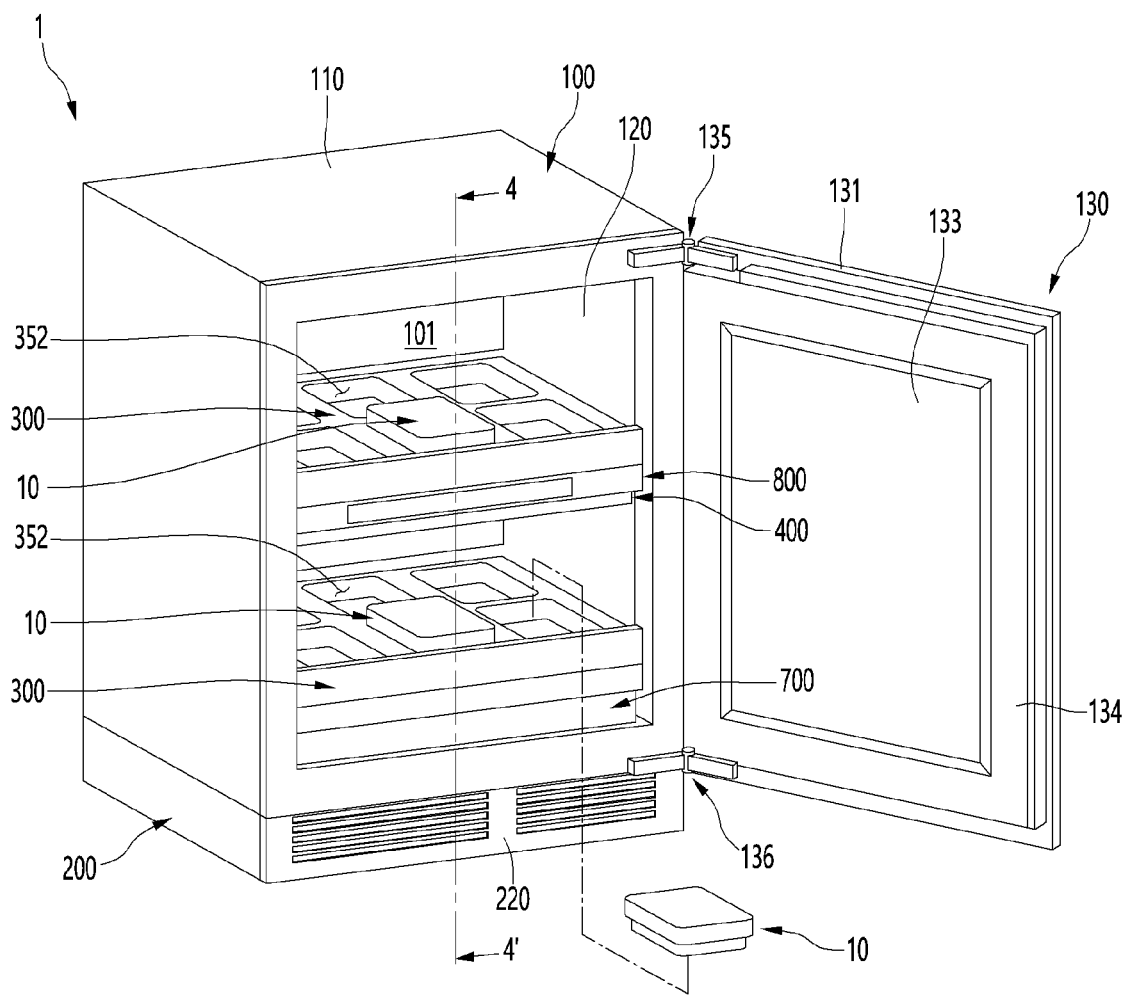
FIG. 2 is a perspective view illustrating a state where a door of the apparatus for cultivating plants is opened.
Figure 3:
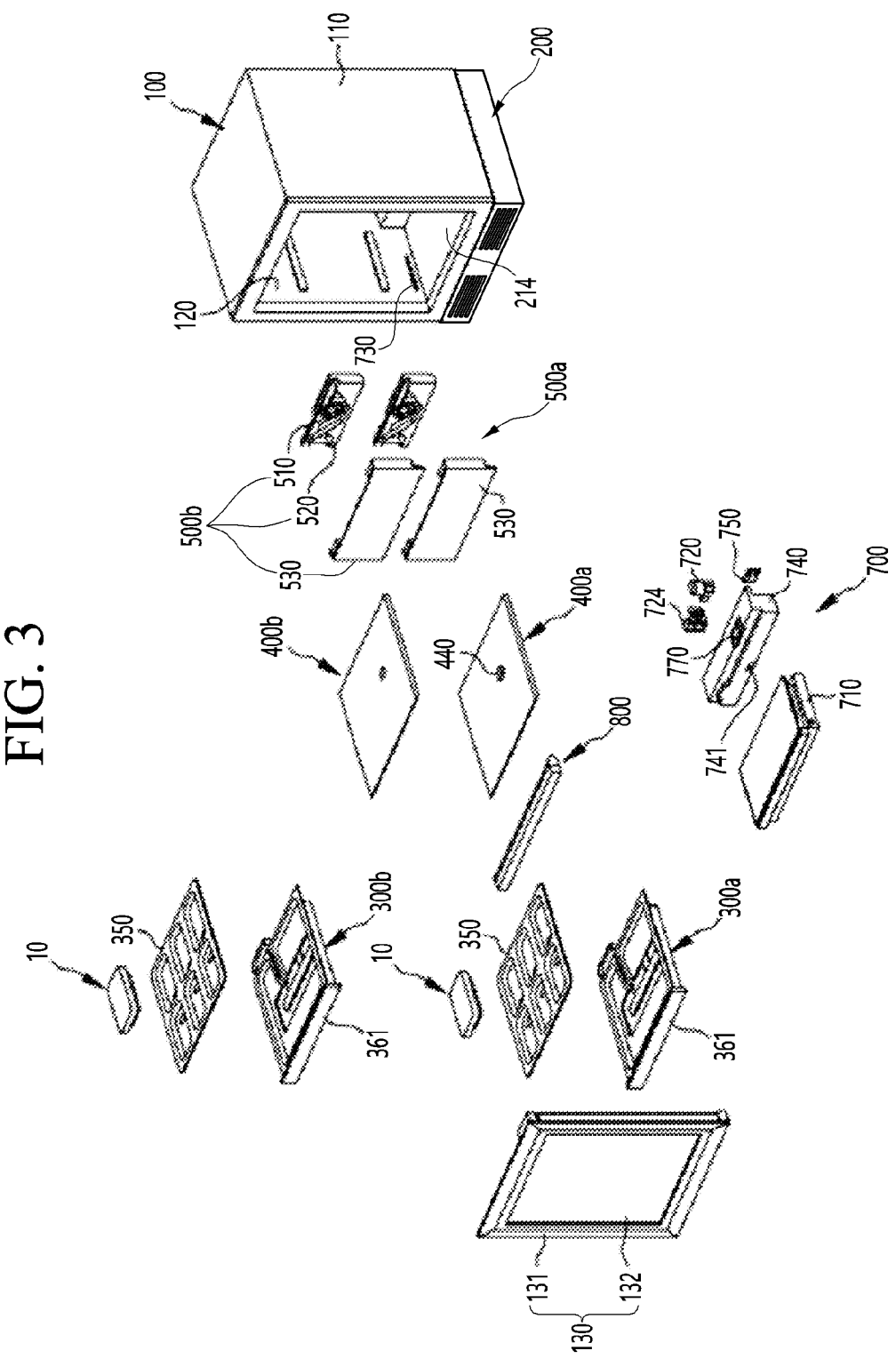
FIG. 3 is an exploded perspective view illustrating the apparatus for cultivating plants.
Figure 4:
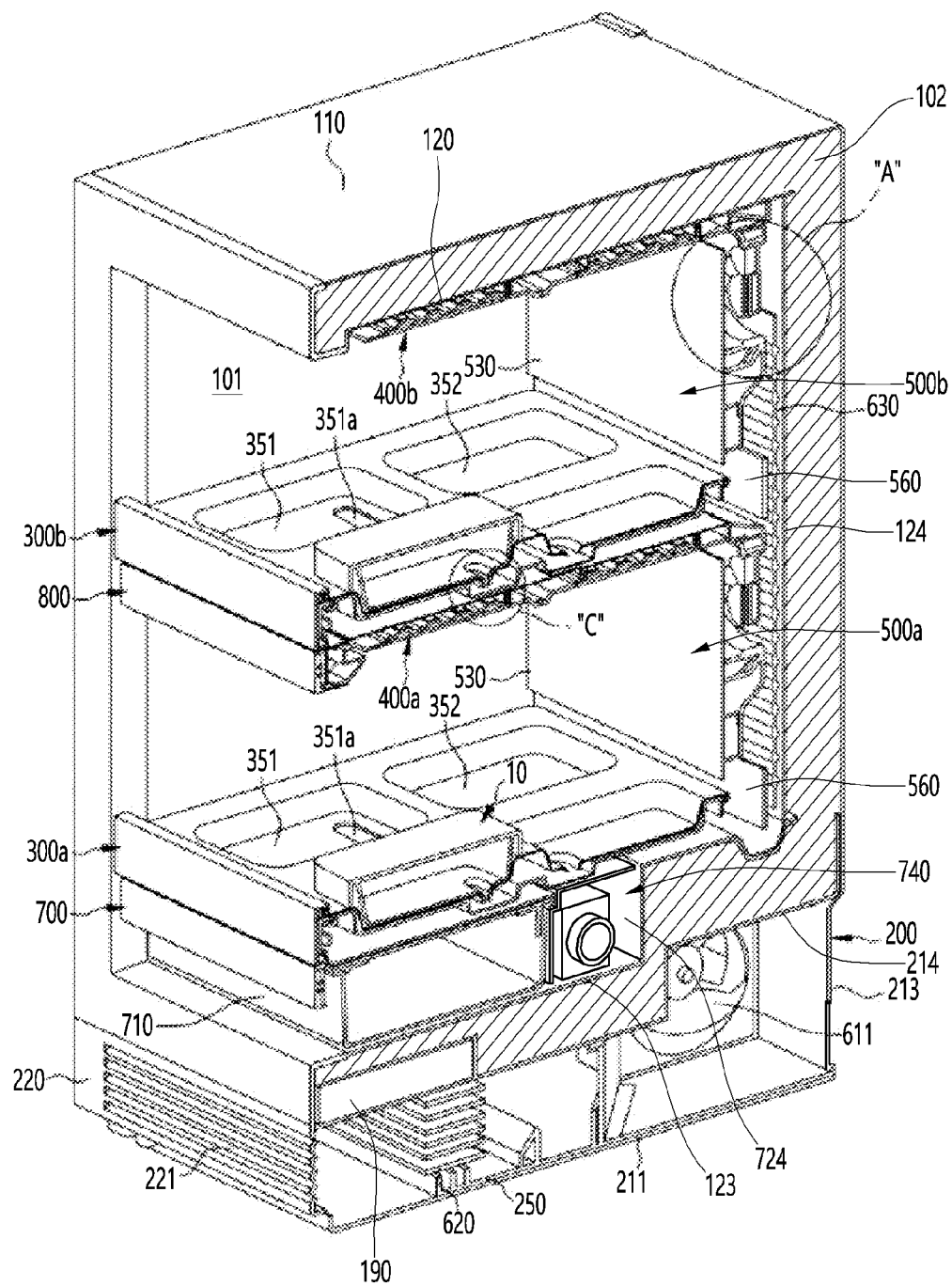
FIG. 4 is a cutaway perspective view taken along line 4-4' of FIG. 2.
Figure 5:
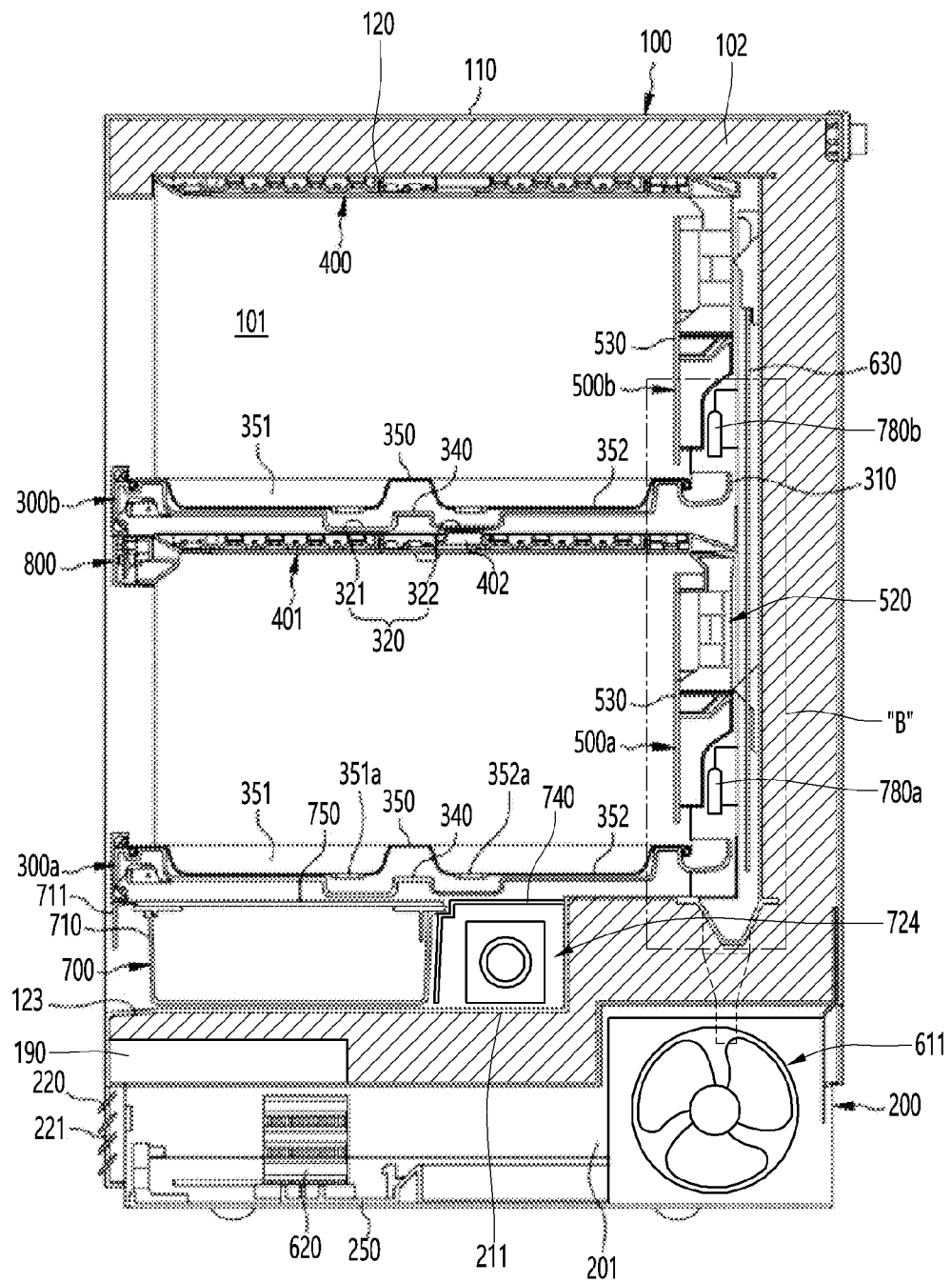
FIG. 5 is a longitudinal cross-sectional view illustrating the cabinet.

FIG. 1 is a perspective view illustrating an apparatus for cultivating plants according to an embodiment of the present disclosure, FIG. 2 is a perspective view illustrating a state where a door of the apparatus for cultivating plants is opened, FIG. 3 is an exploded perspective view illustrating the apparatus for cultivating plants, FIG. 4 is a cutaway perspective view taken along line 4-4' of FIG. 2, and FIG. 5 is a longitudinal cross-sectional view illustrating the cabinet.

Looking at the whole with respect to the apparatus for cultivating plants 1 according to the embodiment of the present disclosure with reference to the drawings, the outer appearance thereof may be formed by a cabinet 100 forming a space in which a plant is cultivated therein, and a door 130 for opening and closing the cabinet 100. In this case, the cultivated plant is usually edible by the user, such as leaf vegetables and herbs that can be used for wrapping or salads, and is easy to cultivate, and it is preferable that plants that do not occupy a lot of space are cultivated, and may be provided in the form of a pod 10 which includes seeds and nutrients. Accordingly, the pod 10 may be referred to as a seed package.

The cabinet 100 is formed to have an open front surface, and a cultivation space 101 may be provided therein. The cabinet 100 may include an outer case 110 forming an outer appearance and an inner case 120 forming the cultivation space 101, and an insulating material 102 may be provided between the outer case 110 and the inner case to insulate the cultivation space and maintain the cultivation space 101 at a set temperature.

The outer case 110 and the inner case 120 may be formed of a metal material and may be formed by combining a plurality of plate-shaped materials with each other. The outer case 110 may be formed in the shape of at least one or more metal plates, and may form an upper surface and both side surfaces of the outer surface of the cabinet 10 in the left and right direction. In addition, the outer case may further include a rear surface of the outer surfaces of the cabinet 10. For example, the back plate 111 to be described below may be provided in the outer case 110. In addition, the inner case 120 may form both side surfaces, a rear surface, and an upper surface of the cultivation space 101 by at least one metal plate.

A plurality of beds 300 may be vertically disposed inside the cabinet 100. In this embodiment, two beds 300a and 300b are vertically provided and may have the same structure. The beds 300 may be referred to as an upper bed 300b and a lower bed 300a, respectively, for convenience of explanation and understanding. Of course, two or more beds 300 may be provided according to the size of the cabinet 100.

The bed 300 may have a structure in which a plurality of pods 10 containing plant seeds and nutrients necessary for cultivation are seated. The bed 300 may be referred to as a shelf or a tray. In addition, the bed 300 may have a structure in which the pod 10 can be seated and maintained in a seated state. In addition, the bed 300 may have a structure which easily seats the pod 10 and can introduce/withdraw so that management and harvesting of plants growing in the pod 10 is facilitated.

In addition, the bed 300 may have a structure in which water supplied from the water tank 700 flows and is delivered to all the pods 10 seated on the bed 300. In addition, the bed 300 may maintain an appropriate water level so as to constantly supply moisture to the pod 10.

Meanwhile, a machine room 200 may be provided below the cabinet 100. In the machine room 200, a compressor 610 and a condenser 620 constituting a refrigeration cycle for adjusting the temperature of the cultivation space 101 may be disposed.

In addition, a grill cover 220 may be provided on the front surface of the machine room 200, and the grill cover 220 may include a grill suction port 221 through which air is suctioned into the machine room 200, and a grill discharge port 222 through which internal air of the machine room 200 is discharged.

Meanwhile, the internal temperature of the cultivation space may be adjusted by the refrigeration cycle 600. In this case, the evaporator 630 may be disposed on the inner rear wall surface of the cultivation space 101. The evaporator 630 may be provided with a roll bond type heat exchanger and may be referred to as a heat exchanger. The evaporator 630 may have a plate-shaped structure that is easily attached to the rear wall surface of the cultivation space 101. In addition, the evaporator 630 minimizes the loss of the cultivation space 101 due to the plate-like structure and is close to the cultivation space 101 to effectively adjust the temperature of the cultivation space 101. Accordingly, the evaporator 630 may be referred to as a temperature adjustment device.

A heater (not illustrated) may be provided on the rear wall surface of the cultivation space 101. Accordingly, heating and cooling may be performed in the rear area of the cultivation space. The interior of the cultivation space 101 by the evaporator 630 and the heater may maintain a temperature suitable for plant growth (eg, 18° C.-28° C.). Of course, if necessary, a configuration for heating other than the heater may be provided, and various heating methods such as a heating structure through hot gas or a heating structure through conversion of a refrigeration cycle will be possible. The temperature inside the cultivation space 101 is sensed by the internal temperature sensor 450, and can be kept constant regardless of the external temperature of the cabinet 100.

In addition, a blower assembly 500 may be provided in front of the evaporator 630. The blower assembly 500 may circulate the interior of the cultivation space 101 to uniformly cool or heat the cultivation space 101.

The blower assembly 500 may include an upper blower assembly 500*b* disposed in an upper space divided by the bed 300 and a lower blower assembly 500*a* disposed in a lower space. The blower assembly 500 disposed vertically has the same structure and shape, except that there is a difference only in the mounting position. The blower assembly 500 may be provided by a number corresponding to the number of the beds 300 and may blow air from the rear toward the front of the bed 300. Accordingly, independent air circulation can be achieved in each space of the interior of the cultivation space 101 partitioned by the bed 300.

The air in the interior of the cultivation space is circulated by the blower assembly 500, and in particular, the circulated air passes through the evaporator 630 so that the entire interior of the cultivation space 101 has a uniform temperature, while temperature adjustment can be rapidly achieved. In addition, the air circulated by the blower assembly 500 may flow while passing through the upper surface of the bed 300 and the lower surface of the light assembly 400.

The air flowing by the blower assembly 500 passes through the upper surface of the bed 300 to make the respiration of the plants grown in the bed 300 more smooth and to make the plants to be shaken appropriately and thus the air can provide the optimal airflow necessary for growth by controlling stress. In addition, the air flowing by the blower assembly 500 can prevent overheating of the light assembly 400 while passing through the lower surface of the light assembly 400.

Meanwhile, the light assembly 400 may be provided above the bed 300. The light assembly 400 provides light necessary for plants by irradiating light toward the bed 300. In this case, the amount of light irradiated by the light assembly 400 may be set to be similar to sunlight, and the amount of light and irradiation time optimized for the cultivated plant may be set.

The light assembly 400 may include an upper light assembly 400*b* provided in an upper space partitioned by the bed 300 and a lower light assembly 400*a* provided in a lower space. The upper light assembly 400*b* may be mounted on an upper surface of the cultivation space 101, and the lower light assembly 400*a* may be mounted on a lower surface of the upper bed 300*b*.

In other words, the upper light assembly 400*b* and the lower light assembly 400*a* may be positioned vertically above the bed 300 disposed below, respectively, and on the upper surface of the partitioned cultivation space 101, it is possible to adjust the growth of cultivated plants by irradiating light toward the bed 300.

A water tank 700 may be provided on a bottom surface inside the cabinet 100. The water tank 700 may store water supplied to the bed 300. The water tank 700 may be positioned below the bed 300 positioned at the lowermost position among the plurality of beds 300, and the front surface the water tank may be positioned at a position corresponding to the front end of the bed 300.

The length of the water tank 700 in the horizontal direction may correspond to the width of the internal space of the cabinet 100. In addition, the length of the water tank 700 in the vertical direction may be formed to correspond to a distance between the bed 300 positioned at the lowermost position and the bottom surface of the cultivation space 101. In other words, the water tank 700 may be formed to fill the entire space below the lower bed 300*a* positioned at the lowermost position, and the space behind the water tank 700 can be covered by the water tank 700.

A pump cover 740 may be provided in a space behind the water tank 700 covered by the water tank 700. A water pump 720 and a water supply valve 724 to be described below may be provided inside the pump cover 740. The pump cover 740 and the internal components of the pump cover 740 and the pipe connected to the components may be referred to as a water supply unit or a water supply module.

The water tank 700 may be provided in the interior of the cultivation space 101 to be capable of being introduced or withdrawn in a front and rear direction. To this end, tank rails 730 for guiding the introduction/withdrawal of the water tank 700 may be provided on both sides of the water tank 700 in the left and right directions. In addition, the water tank 700 may be opened in a state of being introduced or withdrawn to have a structure in which water can be additionally supplied.

Meanwhile, the display assembly 800 may be provided in the opened front half portion of the cabinet 100. The display assembly 800 may output the operating state of the apparatus for cultivating plants 1 to the outside. In addition, the display assembly 800 may be provided with a manipulation part to which a user's manipulation is input to set and input the overall operation of the apparatus for cultivating plants. For example, the display assembly 800 may include a touch screen structure and may include a structure such as a button or a switch.

The door 130 may have a size capable of shielding the opened front surface of the cabinet 100. In addition, an upper hinge 135 and a lower hinge 136 may be shaft-coupled to the upper end and lower end of one of the sides of the door 130 in the left and right direction. The door 130 may be rotatably coupled to the cabinet 100 by the upper hinge 135 and the lower hinge 136, and the cultivation space 101 can be opened and closed by the rotation of the door 130.

At least a part of the door 130 may have a see-through structure, and the cultivation space 101 may be checked even when the door 130 is closed.

In detail, the door 130 may include a door frame 131 forming a circumference and having an opening in the center, and door panels 132 and 133 for shielding the opening of the door frame 131. The door panels 132 and 133 may be formed of glass or a transparent plastic material to have a structure in which the inside can be seen through. In addition, the door panels 132 and 133 may have a color or a colored coating, metal deposition, or film attached thereto so that the cultivation space 101 is selectively visible or invisible.

Meanwhile, a plurality of the door panels 132 and 133 may be disposed in the front and rear direction, and an insulating space may be formed between the plurality of door panels 132 and 133. In addition, if necessary, the door panels 132 and 133 may include insulating glass. Accordingly, it is possible to insulate the inside and the outside of the cabinet 100.

In addition, if necessary, the entire front outer appearance of the door 130 may be formed by the door panel 132 disposed on the front surface of the door 130.

In addition, a gasket 134 may be provided on the rear surface of the door 130. The gasket 134 may be disposed along a position corresponding to the circumference of the opened front surface of the cabinet 10. Accordingly, in a state where the door 130 is closed, the opened front surface of the cabinet 10 may be sealed by the gasket 134, and a space between the cabinet 10 and the door 130 may be sealed by the gasket 134.

Meanwhile, components of reference numerals not described in FIGS. 1 to 5 will be described below.

Hereinafter, the structure of the apparatus for cultivating plants 1 having the above structure will be described in more detail with reference to the drawings for each configuration.

Figure 6:
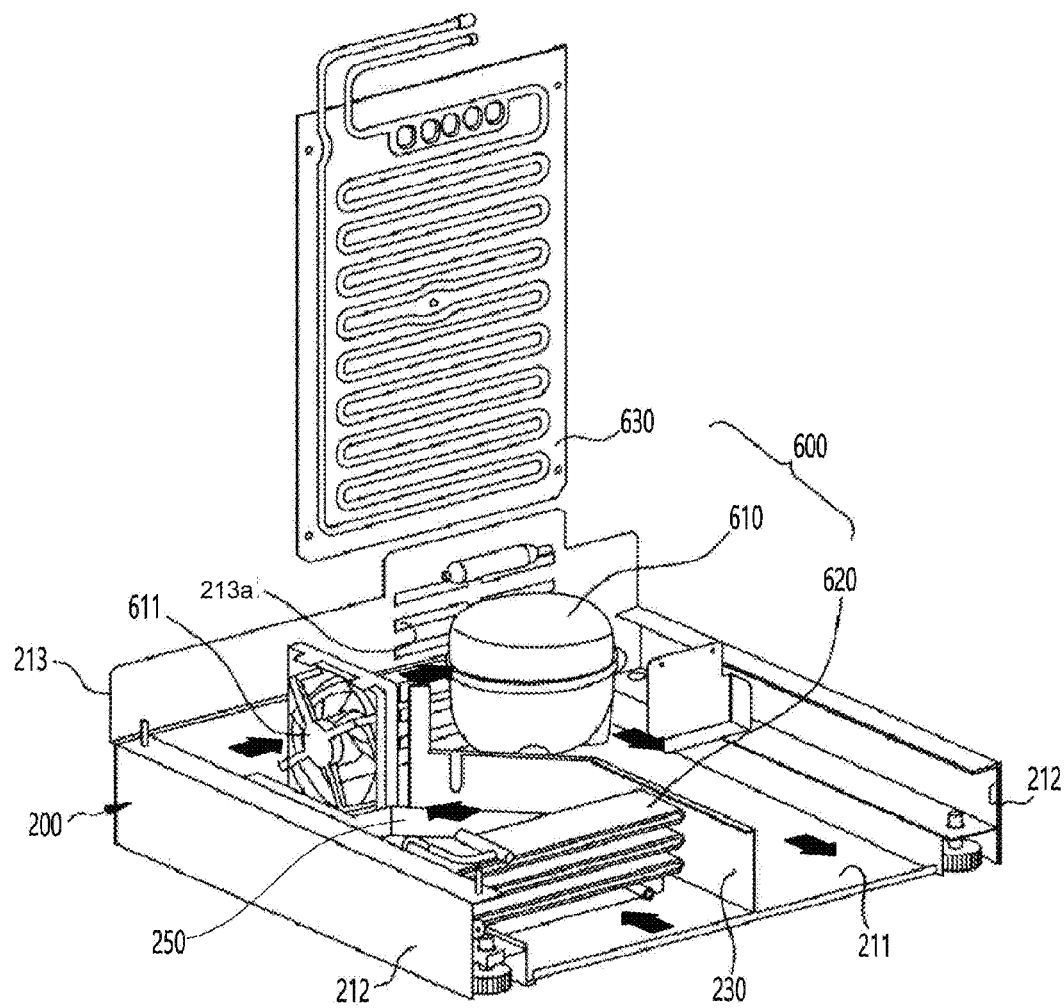
FIG. 6 is a perspective view illustrating the internal structure of a machine room of the apparatus for cultivating plants.

FIG. 6 is a perspective view illustrating the internal structure of the machine room of the apparatus for cultivating plants.

As illustrated, the machine room 200 is mounted on the lower surface of the cabinet 100 and forms a space independent from the cultivation space 101 under the cabinet 100. The machine room 200 may be configured by a bottom plate 211 forming a lower surface, a pair of side plates 212 forming both side surfaces, and a rear plate 213 forming a rear surface.

The bottom plate 211, the side plate 212, and the rear plate 213 may be coupled in a single module form to be referred to as a machine room frame. The space formed by the machine room frame may be formed so that the upper surface and the front surface are opened. Accordingly, the machine room frame is coupled to the lower surface of the cabinet 100 to form the machine room 200 space under the cabinet 100.

The internal space of the machine room 200 may be partitioned by a barrier 230. The barrier 230 may extend backward from the opened front end of the machine room 200. A condenser 620 may be provided in a space on the left side partitioned by the barrier 230, and a compressor 610 may be provided on a space on the right side partitioned by the barrier 230. In addition, a heat dissipation fan 611 for forcibly flowing air from the left to the right may be provided at the rear end of the barrier 230.

Meanwhile, a grill cover 220 may be provided on the opened front surface of the machine room 200. The grill cover 220 shields the open front surface of the machine room 200, a grill suction port 221 is formed in the front surface of the left space partitioned by the barrier 230, and a grill discharge port 222 may be formed in the front surface of the right space, respectively. A discharge outlet 213a may be formed on the rear plate 213.

Accordingly, when the heat dissipation fan 611 is driven, external air is suctioned and flows into the left space of the machine room 200 through the grill suction port 221, and the suctioned air exchanges heat with the refrigerant in the condenser 620 while passing through the condenser 620. Then, the air passing through the heat dissipation fan 611 cools the compressor 610 while passing through the compressor 610. Also, the air passing through the compressor 610 may be discharged forward through the grill discharge port 222.

In other words, in a state where the apparatus for cultivating plants 1 is installed, both the suction of external air and the discharge of the air inside the machine room 200 are performed from the front while passing through the grill cover 220. Accordingly, the apparatus for cultivating plants 1 can be installed even in a space where the left and right sides and the rear surface are blocked. In particular, even if the apparatus for cultivating plants 1 is installed in a piece of furniture such as a sink as a built-in, cooling and heat exchange of the compressor 610 and the condenser 620 inside the machine room 200 can be effectively performed.

Meanwhile, the evaporator 630 constituting the refrigerating cycle 600 is provided inside the cabinet 100, is vertically disposed on the rear surface of the cultivation space 101, and can be easily connected by components and refrigerant pipes in the machine room 200.

A condensate receiver 250 is provided in the machine room 200. At this time, the condensate receiver 250 may be provided below the condenser, and the condensate flowing down from the condenser 620 may be stored, and water discharged from the cultivation space 101 may be stored.

Meanwhile, the upper side of the machine room 200 may be provided with a controller 190 for controlling the operation of each component of the apparatus for cultivating plants. For example, the controller 190 may be provided between the upper surface of the machine room and the inner bottom surface of the cultivation space 101 and may be accessible by opening the grill cover 220. Therefore, even when the apparatus for cultivating plants is installed and in use, the controller 190 can be easily accessed, and maintenance can be facilitated.

Figure 7:
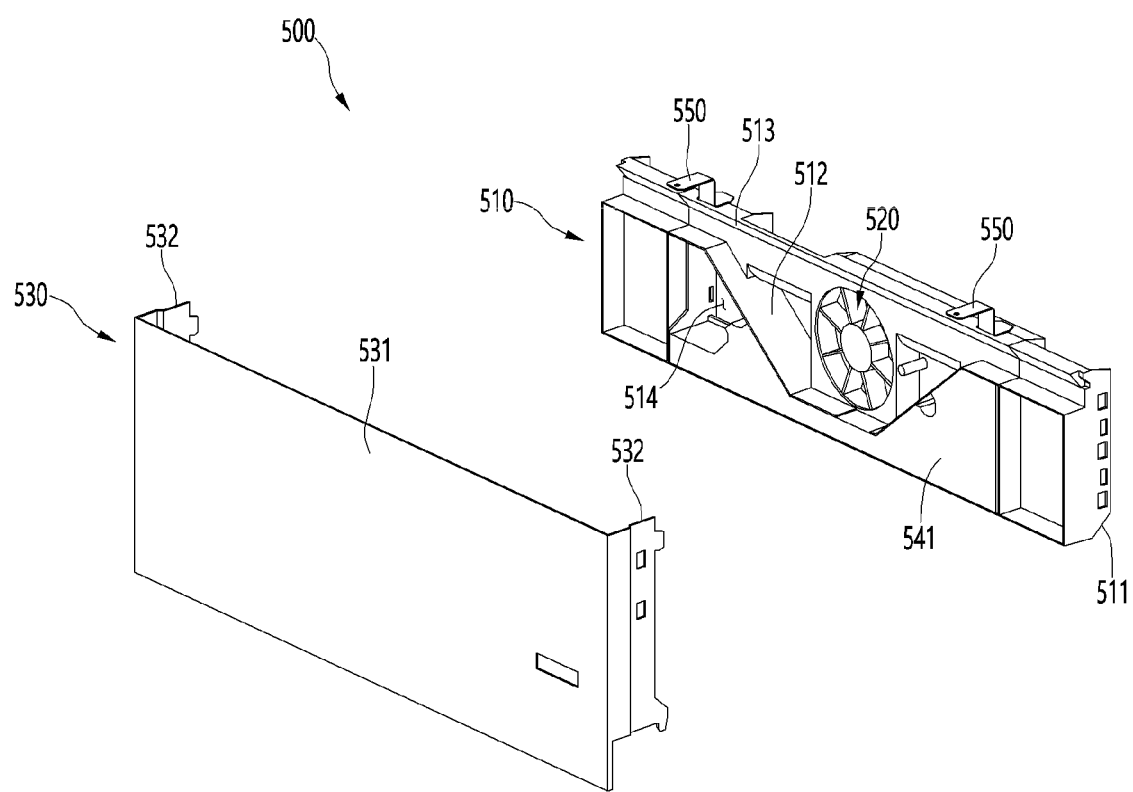
FIG. 7 is an exploded perspective view illustrating a blower assembly of the apparatus for cultivating plants viewed from the front.
Figure 8:
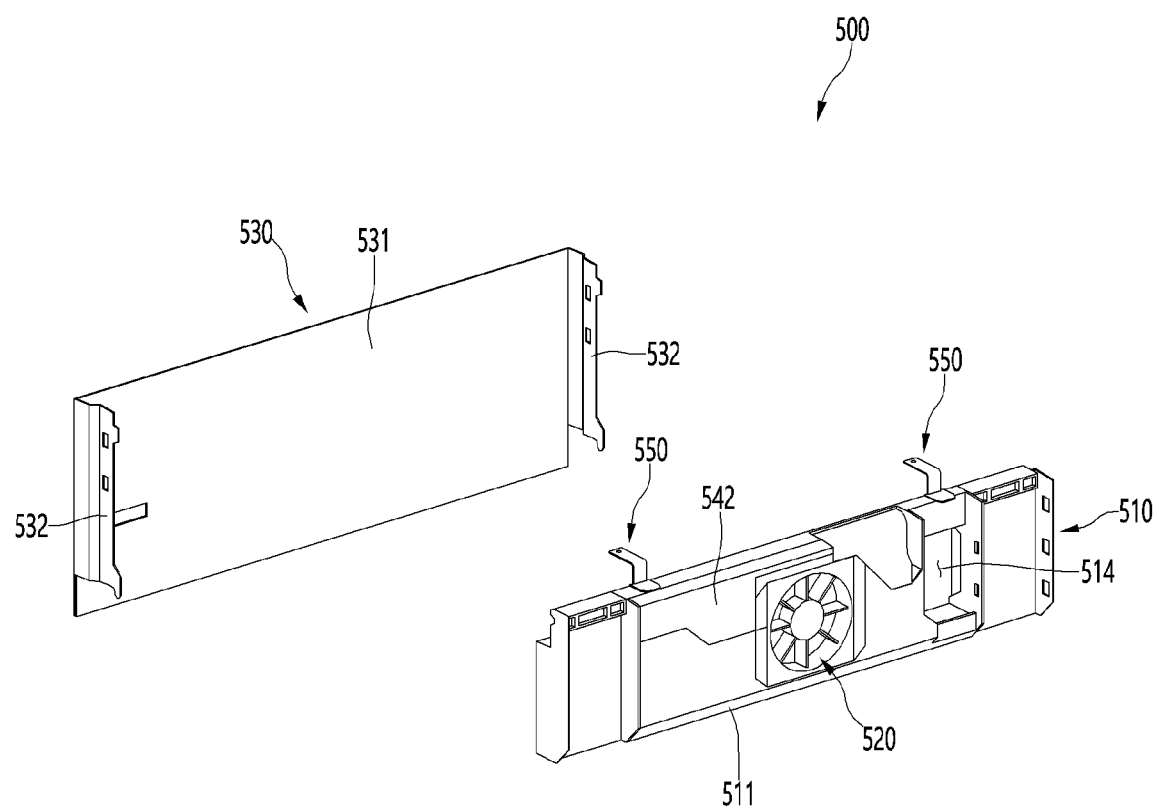
FIG. 8 is an exploded perspective view illustrating the blower assembly viewed from the rear.
Figure 9:
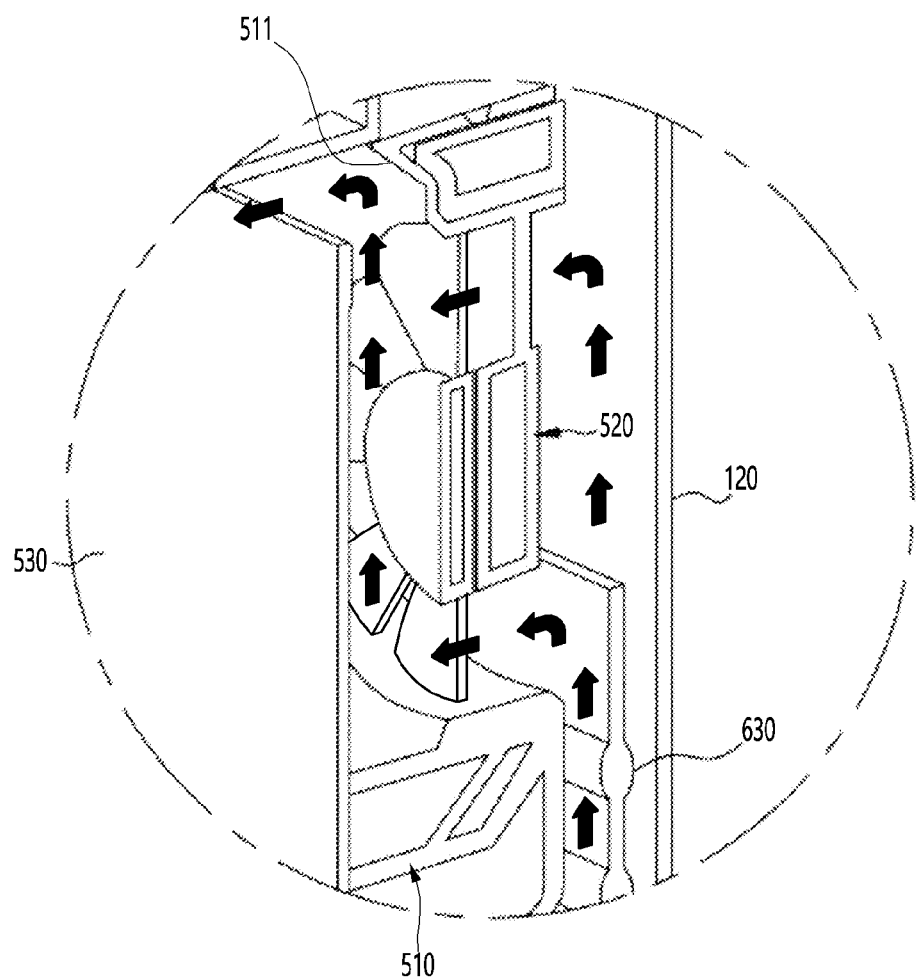
FIG. 9 is an enlarged view illustrating part "A" of FIG. 4.

FIG. 7 is an exploded perspective view illustrating the blower assembly of the apparatus for cultivating plants viewed from the front, FIG. 8 is an exploded perspective view illustrating the blower assembly viewed from the rear, and FIG. 9 is an enlarged view illustrating part "A" of FIG. 4.

As illustrated in the drawing, the evaporator 630 may be provided on the rear wall surface of the cultivation space 101, and the blower assembly 500 may be provided in front of the evaporator 630.

The blower assembly 500 is configured to circulate air above the cultivation space 101 partitioned by the bed 300. Accordingly, the blower assembly 500 is provided in a number corresponding to the number of the beds 300 and is provided at the lower end of the light assembly 400 and at an upper portion adjacent to the bed 300.

As illustrated in the drawing, the blower assembly 500 may include a blower fan 520, a fan guide 510 to which the blower fan 520 is mounted, and a blower cover 530 shielding the fan guide 510 and the evaporator 630.

In detail, the blower fan 520 is formed in the shape of a box fan and may be provided in the center of the fan guide 510. In addition, the blower fan 520 may discharge the air flowing thereinto from the rear to the front of the blower assembly 500.

The fan guide 510 provides a space in which the blower fan 520 is mounted and is configured to guide the discharge of air discharged by the blower fan 520. The fan guide 510 is injection-molded with a plastic material, and the blower fan 520 may be mounted in the center of the rear surface of the fan guide 510.

Meanwhile, an air guide 512 is formed on the front surface of the fan guide 510 to guide air discharged from the blower fan 520 upward. The air guide 512 may be provided on both sides in the left and right direction with respect to the center of the blower fan 520 and may be configured to become wider toward the upper side. Accordingly, the air discharged by the blower fan 520 flows along the inclined surface and may become closer to the discharge port formed at the upper end of the fan guide 510 toward the outside.

A discharge guide 513 may be formed on the front upper end of the fan guide 510. The discharge guide 513 forms a surface that protrudes forward from the lower side to the upper side. In other words, the discharge guide 513 forms an inclined surface or a round surface, and guides the air flowing from the lower side to the upper side toward the front. At this time, since the end portion of the discharge guide 513 is adjacent to the lower surface of the light assembly 400, the air discharged from the blower assembly 500 can flow from rear end to the front side of the lower surface of the light assembly 400 by the discharge guide 513. The light assembly 400 can be cooled when the light assembly 400 is heated by such an air flow.

A connector hole 514 may be formed at one side of the fan guide 510. The connector hole 514 is formed to be opened at a position corresponding to the connector 124*a* mounted on the rear wall surface of the inner cultivation space. Therefore, when the blower assembly 500 is mounted, the connector 124*a* is inserted into the connector hole 514 so as not to interfere with each other. In addition, the electric wire connected to the blower fan 520 may be connected to the connector exposed through the connector hole 514.

Blower brackets 550 that are inserted into and mounted on the blower assembly mount 415 may be provided on both sides of the upper surface of the fan guide 510 in the left and right direction. One end of the blower bracket 550 may be coupled to the upper surface of the fan guide 510, and the other end thereof may be mounted to the blower assembly mount 415 formed at the rear end of the lower surface of the light assembly 400. Accordingly, the light assembly 400 and the blower assembly 500 may be coupled to each other in a vertically intersecting form. In addition, the blower assembly 500 may discharge air from the rear end of the light assembly 400 toward the front.

In addition, an inlet guide 511 may be formed on a lower surface of the fan guide 510. The inlet guide 511 may be inclined upward toward the rear and may guide air suctioned in from the lower side of the fan guide 510 to smoothly flow to the rear of the fan guide 510.

In addition, recessed spaces are formed in the front and rear surfaces of the fan guide 510, and a front insulating material 541 and a rear insulating material 542 may be disposed inside the recessed space, respectively. Accordingly, it is possible to prevent the cold air generated in the evaporator 630 from being transmitted to the front directly through the blower assembly 500.

Meanwhile, the blower cover 530 may shield the fan guide 510 and components mounted on the fan guide 510 in front of the fan guide 510. In addition, the blower cover 530 is extended to a position adjacent to the upper end of the bed to be capable of preventing the evaporator 630 and the rear wall surface of the inner case 120 from being exposed in a case where the blower assembly 500 is mounted.

In addition, the blower cover 530 and the bed 300 may be slightly spaced apart to each other, and the air flowing into the rear along the bed 300 through between the lower end of the blower cover 530 and the upper surface of the bed 300 may be suctioned to face the blower fan 520.

At this time, in order to prevent the evaporator 630 from being exposed through the gap between the blower cover 530 and the bed 300, a shielding plate 560 can be further provided in a corresponding area of the evaporator 630.

The blower cover 530 may form the outer appearance of the rear wall surface of the cultivation space 101.

The blower cover 530 may be formed of the same metal material as the inner case 120 and may be formed by bending a plate-shaped material. The blower cover 530 may include a front portion 531 and a side portion 532.

The front portion 531 may be exposed through the cultivation space 101 and may be formed to correspond to a horizontal length of the cultivation space 101. In addition, the upper end of the front portion 531 may be positioned adjacent to the upper end of the fan guide 510 and the upper end of the light assembly 400, and serves as an outlet through which the air substantially discharged by the blower fan 520 is discharged into the cultivation space 101. The lower end of the front portion 531 may extend further downward than the lower end of the fan guide 510 and may be positioned adjacent to the upper surface of the bed 300, and serves as a suction port in which air suctioned substantially toward the blower fan 520 flows.

In other words, by the blower cover 530, the rear components are shielded and the rear outer appearance of the cultivation space 101 is formed, and at the same time, the blower cover may serve as a suction port for air flowing along the bed 300 and a discharge port for air discharged along the light assembly 400 so that air circulates in the cultivation space 101. In particular, the structure of the blower assembly 500 may allow air to flow along the bed 300 and the light assembly 400, and while flowing along the rear of the fan guide 510, the evaporator 630 or the air cooled or heated by the heater continuously circulates inside the cultivation space 101, so that the temperature of the cultivation space 101 can be adjusted. Through this continuous circulation of air, the cultivation space 101 maintains a constant temperature as a whole, and the inside of the cultivation space can be in an optimal state, such as providing airflow for plants to grow inside the bed 300.

The side portion 532 may be bent backward at both ends of the front portion 531 and may be coupled to both side surfaces of the fan guide 510. The side portion 532 may have a coupling structure corresponding to the side surface of the fan guide 510 and may be coupled to each other by the elasticity of the side portion 532 itself without fastening a separate coupling member.

Figure 10:
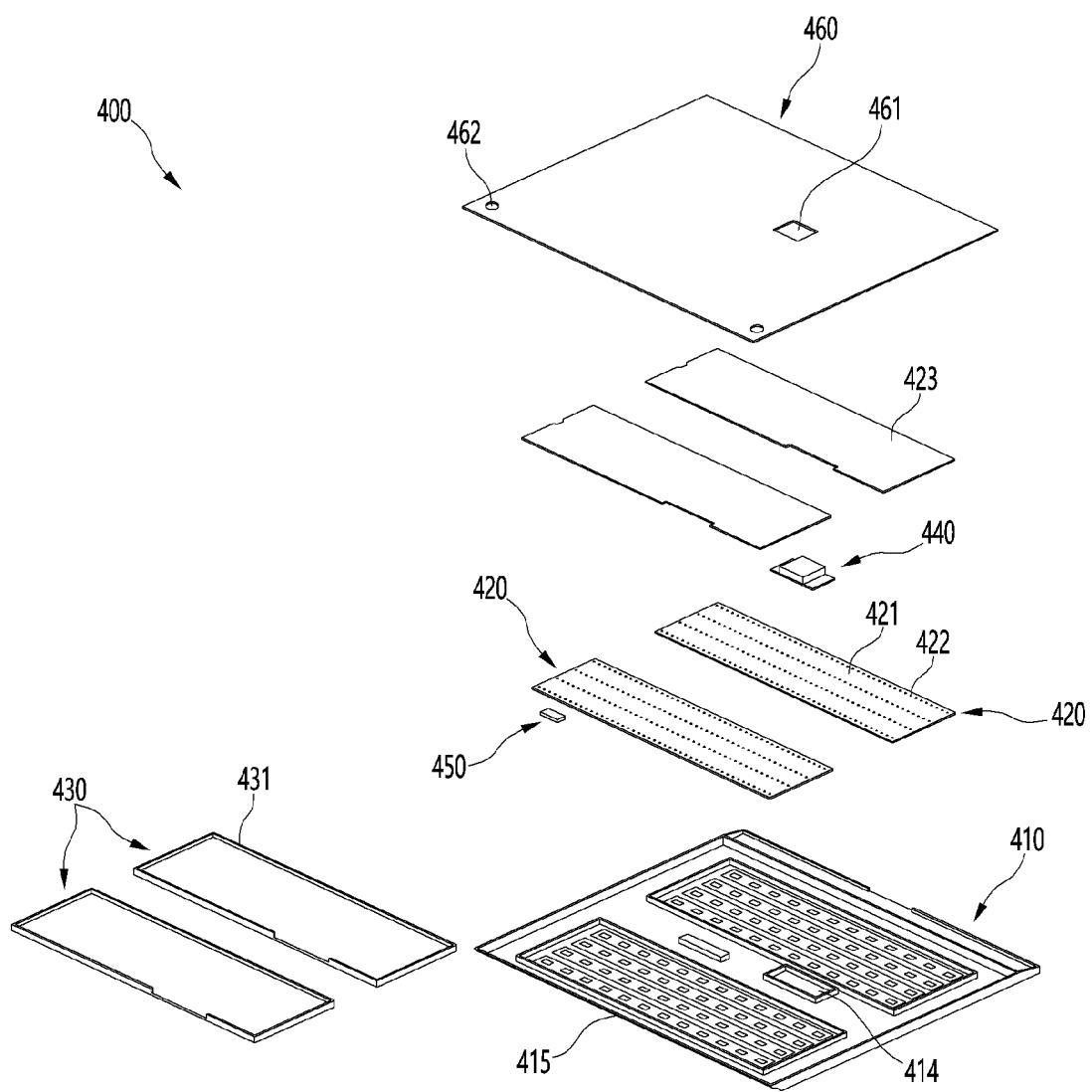
FIG. 10 is an exploded perspective view illustrating the light assembly of the apparatus for cultivating plants.
Figure 11:
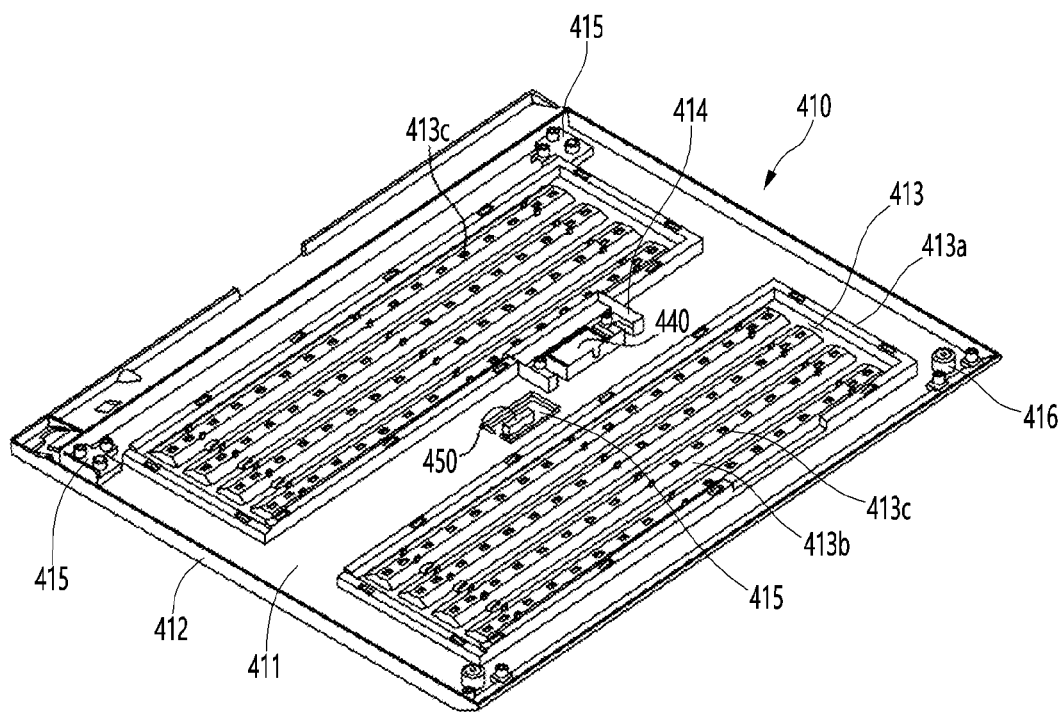
FIG. 11 is a perspective view illustrating a light case of the light assembly.
Figure 12:
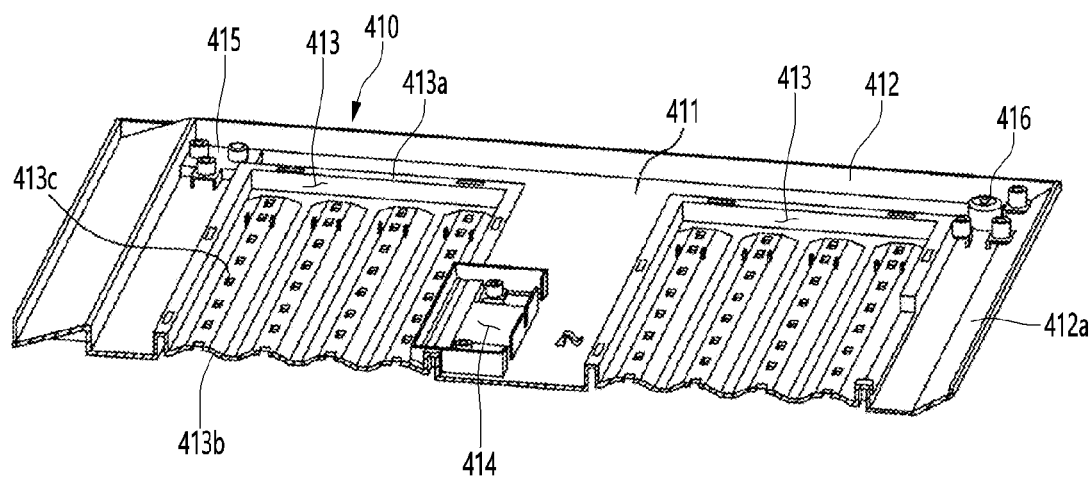
FIG. 12 is a cutaway perspective view illustrating the light case.

FIG. 10 is an exploded perspective view illustrating the light assembly of the apparatus for cultivating plants, FIG. 11 is a perspective view illustrating a light case of the light assembly, and FIG. 12 is a cutaway perspective view illustrating the light case.

As illustrated in the drawing, the light assembly 400 may have a size corresponding to the upper surface of the cultivation space 101 or the bed 300. Therefore, light can be evenly irradiated to the entire area of the bed 300 disposed below.

The light assembly 400 may include a light case 410 which has an open lower surface and in which the LED module 420 can be accommodated, and a cover plate 460 for shielding the opened upper surface of the light case 410.

The light case 410 may include a bottom surface 411 formed in a rectangular plate shape, and a case edge 412 extending upward along the circumference. Meanwhile, the front surface 412a of the case edge 412 may be inclined to minimize exposure of the light assembly 400 when the user opens the door 130.

A module mount 413 may be formed in the front half portion and the rear half portion based on the center of the bottom surface 411 of the light case 410. The module mount 413 is a part on which the LED module 420 is mounted and may be configured to mount a plurality of LED modules 420. When the LED module 420 is configured as one, there is a problem that the entire LED module 420 has to be replaced when an abnormality occurs in the LED module 420, and in a case where the number of the LED modules 420 is too large, there is a problem in that mounting and assembly of the LED modules are difficult and the disposition of electric wires connected to the LED module 420 is not easy. Accordingly, the LED module 420 is composed of two and disposed in the front and rear direction, and a space in which a temperature sensor mount 415 and a residual water detection device mount 414 for disposing a temperature sensor 450 and a residual water detection sensor 440 can be secured between the LED modules 420.

Meanwhile, since the bed 300 is not provided on the upper light assembly 400b of the light assembly 400 mounted on the upper surface of the cultivation space, the residual water detection sensor 440 may not be provided. The residual water detection device mount 414 may be formed in both the upper light assembly 400b and the lower light assembly 400a, but the residual water detection sensor 440 is provided only in the lower light assembly 400a and thus can be detected whether there is residual water on the upper bed 300b.

The module mount 413 may be defined by a mount edge 413a. The mount edge 413a protrudes upward along the circumference of the LED module 420, and thus a space in which the LED module 420 is accommodated by the mount edge 413a may be formed. The mount edge 413a may have a protruding shape when viewed from above, and has a recessed shape when viewed from below, so that the light cover 430 to be described below can be mounted thereon.

A light groove 413b may be formed inside the module mount 413. The light groove 413b is formed along the disposition of the LEDs 422 provided in the LED module 420, extends from the left end to the right end inside the module mount 413, and can be disposed continuously in the front and rear direction.

The light groove 413b may have a protruding shape when viewed from above and have a recessed shape when viewed from below. In addition, a plurality of LED holes 413c may be formed along the protruding center of the light groove 413. The LED holes 413c may be formed at corresponding positions to allow the LEDs 422 to be installed thereon. In addition, both sides of the light groove 413b are inclined or rounded around the LED hole 413c so that the light irradiated from the LED 422 can be reflected through the light groove 413b and irradiated downward. In addition, the inner surface of the light groove 413b may be surface-treated or coated to more effectively reflect light.

The LED module 420 may be configured such that a plurality of LEDs 422 are mounted on a substrate 421. The substrate 421 may be formed to have a size corresponding to that of the module mount 413, and thus may be fixed inside the mount edge 413a.

In addition, a plurality of the LEDs 422 may be continuously disposed at regular intervals on the substrate 421. In this case, the LED 422 may be disposed at a position corresponding to the LED hole 413c. The LED 422 may be configured to have a light quantity (wavelength) similar to sunlight and may be configured to irradiate light of a color capable of promoting photosynthesis of plants.

In addition, a cover sheet 423 may be provided above the LED module 420. The cover sheet 423 is to prevent moisture penetration into the substrate 421 or contamination damage thereof and may be formed in a size capable of completely shielding the substrate 421 from above. The cover sheet 423 may be formed of a dielectric material, and may be formed of an insulating material to prevent heat from penetrating upward during the operation of the LED 422.

Meanwhile, an electric wire guide 417 for guiding electric wires connected to the LED module 420 may be formed inside the light case 410. The electric wire guide 417 is positioned on one of both sides in the left and right direction and may be disposed in the front and rear direction along the space between the module mount 413 and the edge 412. Accordingly, the electric wire connected to the LED module 420 may be guided to the rear end of the light case 410 and may be connected to the connector 124a on the rear surface of the cultivation space 101.

In addition, blower assembly mounts 415 in which the blower assembly 500 can be mounted may be formed on both sides of the rear end of the light case 410. The blower assembly mount 415 may be formed by recessing the lower surface of the light case 410 so that the blower brackets 550 provided on both upper sides of the blower assembly 500 can be inserted.

The cover plate 460 may have a size corresponding to the size of the light case 410 and is formed in a plate shape to shield the opened upper surface of the light case 410. Boss holes 462 corresponding to mounting bosses 416 formed at four corners of the light case 410 may be formed in the cover plate 460. In addition, the screw fastened below the mounting boss 416 may pass through the boss hole 462 to be fastened to the surface on which the light assembly 400 is mounted.

In addition, a sensor hole 461 may be formed at a position corresponding to the residual water detection sensor 440 in the cover plate 460. Therefore, the residual water detection device provided with the residual water detection sensor 440 may be exposed upwards of the cover plate 460 and contact the lower surface of the bed 300 disposed above to detect residual water inside the bed 300. Of course, since the bed 300 is not disposed above the uppermost light assembly 400b among the light assemblies 400, the residual water detection device and the sensor hole 461 may be omitted.

A plurality of light assemblies 400 may be provided in a case where the cultivation space 101 is partitioned by a multi-stage bed 300. In addition, the uppermost light assembly 400 may be fixedly mounted on the upper surface of the cultivation space 101, and the lower light assembly 400 may be fixedly mounted adjacent to the lower surface of the bed 300 at the lower side of the bed 300. In this case, the screw fastened for mounting the light assembly 400 may be fastened through the mounting boss 416 and the boss hole 462.

Meanwhile, a light cover 430 may be provided on a lower surface of the light case 410. The light cover 430 is mounted on the light case 410 to form a portion of the lower surface of the light case 410, shields the module mount 413 from below, and can be configured to protect the LED 422 disposed therein.

The light cover 430 may be formed of a transparent material to allow light to pass through, and a coating or surface treatment for light diffusion may be added to the light cover 430.

A cover edge 431 bent upward may be formed around the light cover 430, and the cover edge 431 may be inserted into the recessed inside of the mount edge 413a to be fixedly mounted.

Figure 13:
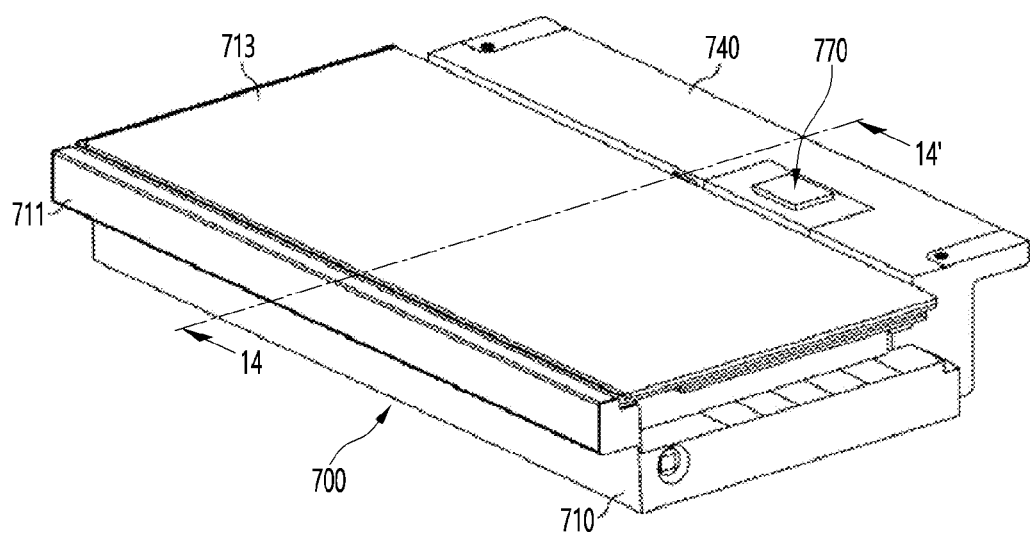
FIG. 13 is a perspective view illustrating a water supply module of the apparatus for cultivating plants.
Figure 14:
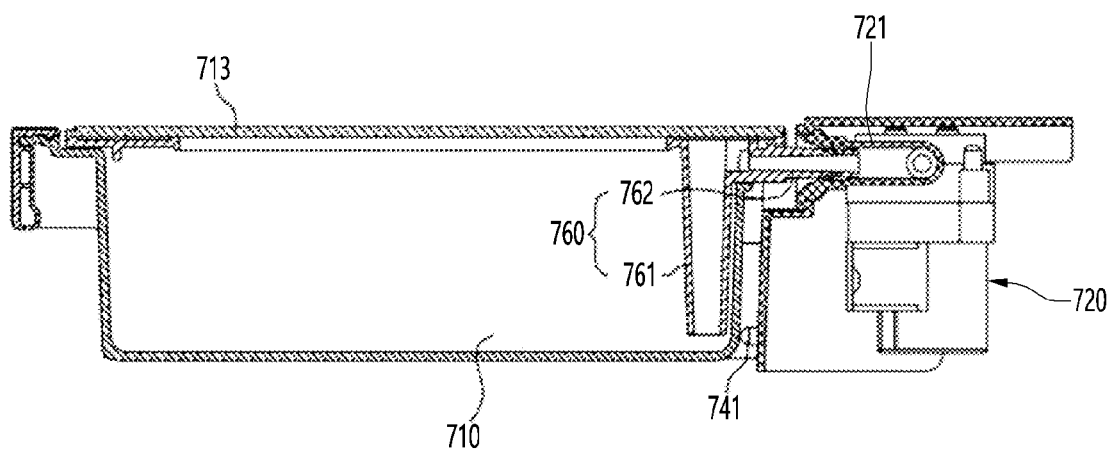
FIG. 14 is a cross-sectional view taken along line 14-14' of FIG. 13.
Figure 15:
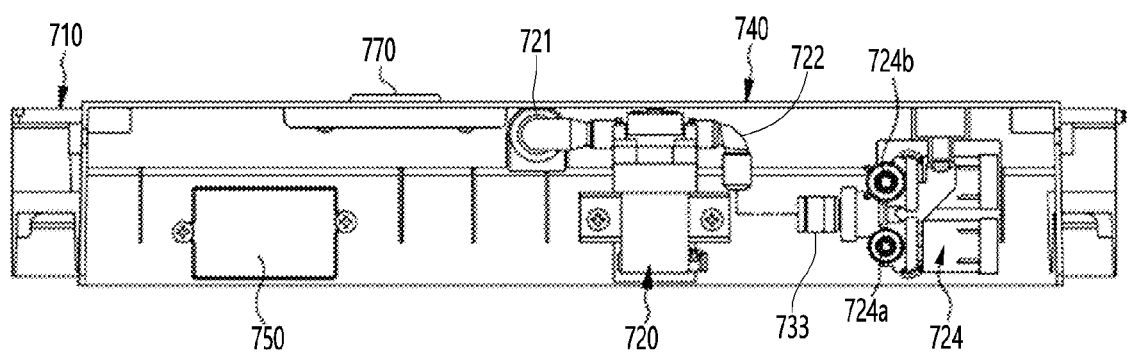
FIG. 15 is a rear view illustrating the pump cover of the water supply module.

FIG. 13 is a perspective view illustrating a water supply module of the apparatus for cultivating plants, FIG. 14 is a cross-sectional view taken along line 14-14' of FIG. 13, and FIG. 15 is a rear view illustrating the pump cover of the water supply module.

As illustrated in the drawing, the water supply module is for supplying water to the pod 10 for cultivation of crops, and the water stored in the apparatus for cultivating plants 1 can be configured to be supplied as much as an appropriate amount at an appropriate time.

In particular, in this embodiment, only water may be supplied through the water supply module, and nutrients may be provided through the pod 10. In other words, various nutrients required for a variety of crops can be provided through the pod 10, and even if different types of pods 10 are provided in one bed 300, nutrients can be provided from each pod. In addition, water may be supplied from the water supply module, and accordingly, constituents other than water are not stored or flow inside the water supply module, so that contamination is prevented and a clean state can be maintained.

The water supply module may include a water tank 700 for storing water for water supply, a water pump 720 for forcibly supplying water from the water tank 700, and a pump cover 740 which forms a mounting space for the water pump 720 and shields the components including the water pump 720. In addition, a water supply valve 724 may be provided on the pump cover 740, and water supply pipes 780a and 780b for guiding water to the bed 300 may be connected to the water supply valve 724.

In detail, the water tank 700 is formed in a rectangular box shape with an open upper surface so that water supplied to the bed 300 can be accommodated therein. In addition, the water tank 700 may be formed to have a width corresponding to the length of the cultivation space 101 in the horizontal direction and can be formed to fill the space between the bottom surface of the cultivation space 101 and the bottom surface of the bed 300.

A tank cover 713 may be provided on the opened upper surface of the water tank 700. The tank cover 713 is for opening and closing the opened upper surface of the water tank 700, and a rear end thereof may be rotatably coupled to the upper surface of the water tank 700. Accordingly, the user may fill the inside of the water tank 700 with water after opening the tank cover 713.

In addition, tank rails 730 may be provided on both side surfaces of the water tank 700 in the left and right direction. The tank rail 730 is for introduction/withdrawal of the water tank 700 and may have a sliding introduction/withdrawal structure. In addition, one end of the tank rail 730 is fixed to the side surface of the water tank 700, and the other end thereof is fixed to both sides of the inner case 120 to guide the introduction/withdrawal of the water tank 700.

Meanwhile, the water tank 700 may be positioned at a position corresponding to the front surface of the bed 300 in the introduction state. In addition, a tank handle 711 may be provided on the front surface of the water tank 700, and the user may withdraw the water tank 700 by holding the tank handle 711 and pulling the tank handle 711 forward.

The water tank 700 may be withdrawn as much as a distance at which the tank cover 713 may be completely exposed, and in a state where the water tank 700 is withdrawn, the tank cover 713 is opened to be capable of being filled with water in the water tank 700.

A connection pipe 760 may be formed in the water tank 700. The connection pipe 760 may be configured such that water from the water tank 700 is supplied to the water pump 720 in a state where the water tank 700 is introduced. In addition, the connection pipe 760 may be configured to be selectively connected to the pipe connection portion 721 formed on the pump cover 740 according to the introduction/withdrawal of the water tank 700.

In detail, the connection pipe 760 may be provided in the tank cover 713, may be positioned in the center of the tank cover 713 in the left and right direction and may be provided at the rear end. Accordingly, even when the tank cover 713 is rotated for opening and closing, the connection pipe 760 may be configured not to interfere with the water tank 700.

The connecting pipe 760 may include a vertical pipe 761 extending downward from the lower surface of the tank cover 713 and a horizontal pipe 762 extending rearward from the upper end of the vertical pipe 761. The vertical pipe 761 may extend downward from the tank cover 713, wherein the vertical pipe 761 may extend to a position adjacent to the bottom surface of the tank cover 713. Accordingly, the water stored in the tank cover 713 may flow upward along the vertical pipe 761.

In addition, the horizontal pipe 762 may be connected to the upper end of the vertical pipe 761 and may extend rearward. The horizontal pipe 762 may protrude further rearward than the rear surface of the water tank 700 and may extend rearward at a position corresponding to the pipe connection portion 721. The horizontal pipe 762 may be inserted into the pipe connection portion 721 in a state where the water tank 700 is fully introduced, and the water flowing upward through the vertical pipe 761 can be guided to be supplied to the pipe connection portion 721.

The horizontal pipe 762 can be completely separated from the pipe connection portion 721 in a case where the water tank 700 is withdrawn, and even if the tank cover 713 is rotated, the horizontal pipe 762 can be configured not to interfere with the pipe connection portion 721. In addition, when the rear surface of the tank cover 713 corresponding to the horizontal tube 762 is partially recessed and the horizontal tube 762 is rotated together by the rotation of the tank cover 713, the horizontal tube 762 can be prevented from interfering with the rear surface of the tank cover 713.

Meanwhile, a pump cover 740 may be provided at the rear of the water tank 700. Both ends of the pump cover 740 may be coupled to both sides of the cultivation space 101 in the left and right direction, and a front surface and an upper surface may be formed to shield the space behind the water tank 700. The bottom surface of the cultivation space 101 in which the pump cover 740 is provided is formed so that the rear half portion is stepped due to the height of the compressor 610, and the pump cover 740 may be disposed in front of the stepped portion. In addition, the water tank 700 is positioned in front of the pump cover 740. In this case, the upper surface of the water tank 700, the upper surface of the pump cover 740, and the bottom surface of the cultivation space 101 above the compressor 610 may have the same height, and can be shielded by the bed 300.

In addition, the pump cover 740 may include a pipe connection portion 721, a water pump 720, and a water supply valve 724.

In detail, the opened front surface of the pipe connection portion connected to the connection pipe 760 may be exposed on one front side of the pump cover 740. The front surface of the pipe connection portion 721 may be formed at a position corresponding to the rear end of the connection pipe 760. Accordingly, when the water tank 700 is introduced, the rear end of the connection pipe 760 may be inserted into the pipe connection portion 721.

In addition, a water pump 720 may be provided on the rear surface of the pump cover 740. The water pump 720 forces the water of the water tank 700 to flow toward the bed 300, and the inlet of the water pump 720 is connected to the pipe connection portion 721 and the outlet 722 thereof may be connected to a pipe 723 connected to the water supply valve 724.

The water supply valve 724 is opened when the water pump 720 is driven so that water can be supplied toward the bed 300. A plurality of water supply valves 724 may be provided according to the number of beds 300, and one water supply valve 724 may be branched to supply water to each of the plurality of beds 300.

In this embodiment, the input side 733 of the water supply valve 724 is connected to the outlet 722 of the water pump 720 by the pipe 723, and the output side of the water supply valve 724 is branched so that the upper fitting 724b and a lower fitting 724a may be formed. In addition, an upper water supply pipe 780b and a lower water supply pipe 780a are connected to the upper fitting 724b and the lower fitting 724a, respectively, so that a structure through which independent water supply to the upper bed 300b and the lower bed 300a is possible may be provided. Accordingly, different water supply environments may be created in the upper bed 300b and the lower bed 300a, and an appropriate amount of water may be supplied to each of the upper bed 300b and the lower bed 300a.

Accordingly, the connection pipe 760 and the pipe connection portion 721, the water pump 720, the water supply valve 724, and the water supply pipe are sequentially connected, and the water in the water tank 700 by the operation of the water pump 720 may be supplied to the bed 300 through the water pump 720 and the water supply valve 724.

Meanwhile, a water level detection device 750 may be provided on the front surface of the pump cover 740. The water level detection device 750 is for detecting the water level of the water tank 700 and may include a capacitance sensor. In addition, the water level detection device 750 may be formed to protrude forward, and may be configured to be in close contact with the circumferential surface of the water tank 700 in a state where the water tank 700 is introduced. In a case where the water level of the water tank 700 is equal to or lower than the set water level by the water level detection device 750, the controller 190 may output through the display assembly 800 that there is no water in the water tank 700 so that the user can fill the water tank 700 with water.

A tank switch 741 may be provided on the front surface of the pump cover 740. The tank switch 741 may protrude toward the water tank 700 and may be configured to be pressed in contact with the rear surface of the water tank 700 in a state where the water tank 700 is fully introduced.

Accordingly, the tank switch 741 may detect whether a state where the water tank 700 is normally mounted and water supply is possible, and transmit it to the controller. When the mounting signal of the water tank 700 is not input by the tank switch 741, the pump may not be operated. In addition, the non-mounting information of the water tank 700 may be displayed on the display assembly 800 so that the user can recognize it. In addition, by maintaining the water tank 700 in a fully retracted state, the water level detection performance of the water tank 700 through the water level detection device 750 may be guaranteed.

Meanwhile, a residual water detection device 742 may be provided on the upper surface of the pump cover 740. The residual water detection device 742 is for determining whether water supplied to the lower bed 300a remains, and in order to distinguish the residual water detection device 742 from the upper residual water detection device provided in the lower light assembly 400a, the residual water detection device 742 may be referred to as a lower residual water detection device 742. The upper residual water detection device and the lower residual water detection device 742 may have the same structure with only a difference in their mounting positions.

In other words, the residual water detection device 742 may include a residual water detection sensor 440 capable of detecting moisture. For example, the residual water detection sensor 440 may use a capacitive sensor. The residual water detection device 742 may be configured to accurately detect whether water is present in the bed 300 by protruding upward to bring the residual water detection sensor 440 close to the lower surface of the bed 300. In order to more accurately detect whether the water remains in the bed 300, a detection portion 323 may protrude from the bed 300, and the residual water detection device 742 may have a structure in close contact with the detection portion 323.

Figure 16:
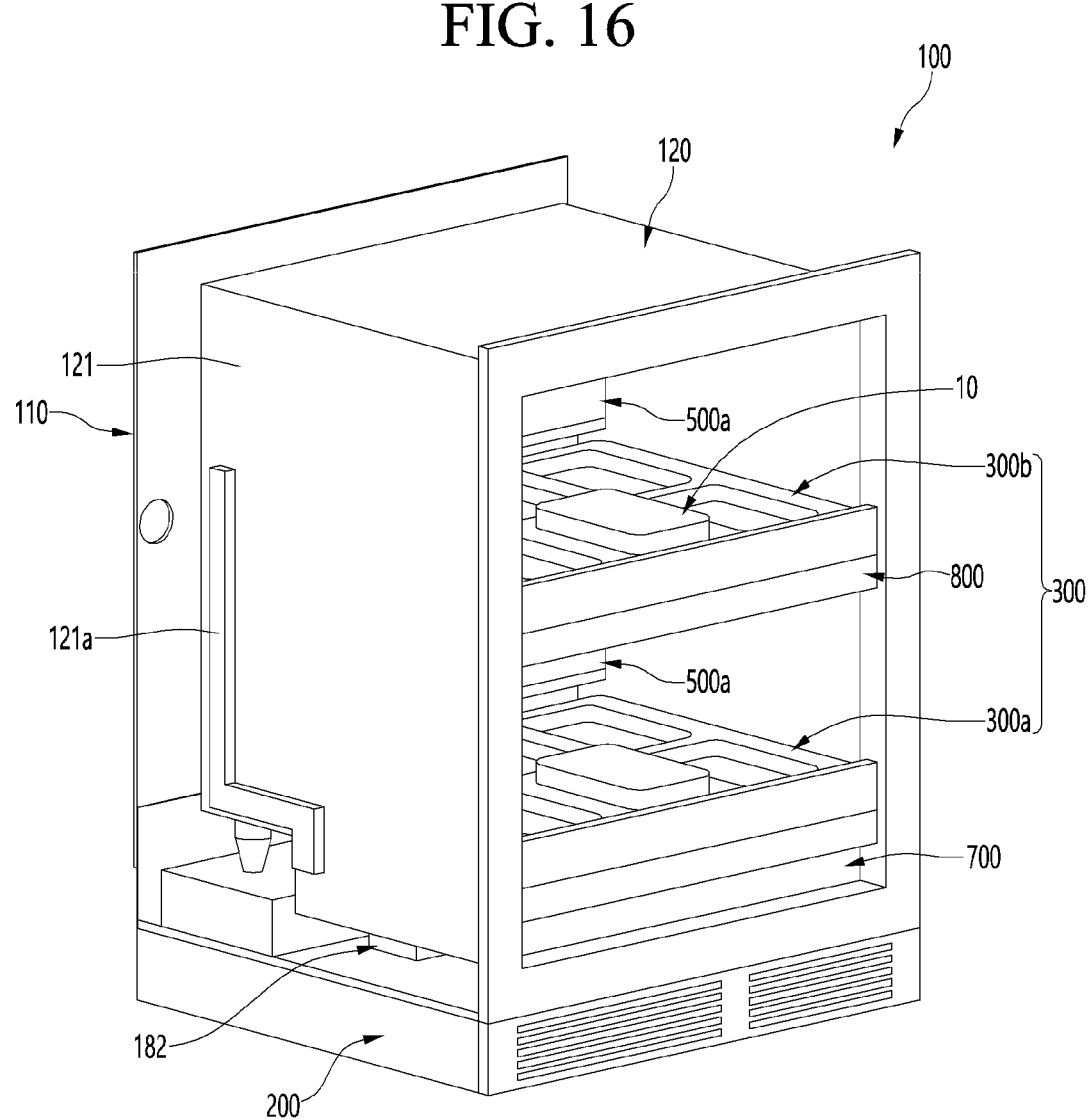
FIG. 16 is a perspective view illustrating a state where a portion of an outer case of the cabinet is removed.
Figure 17:
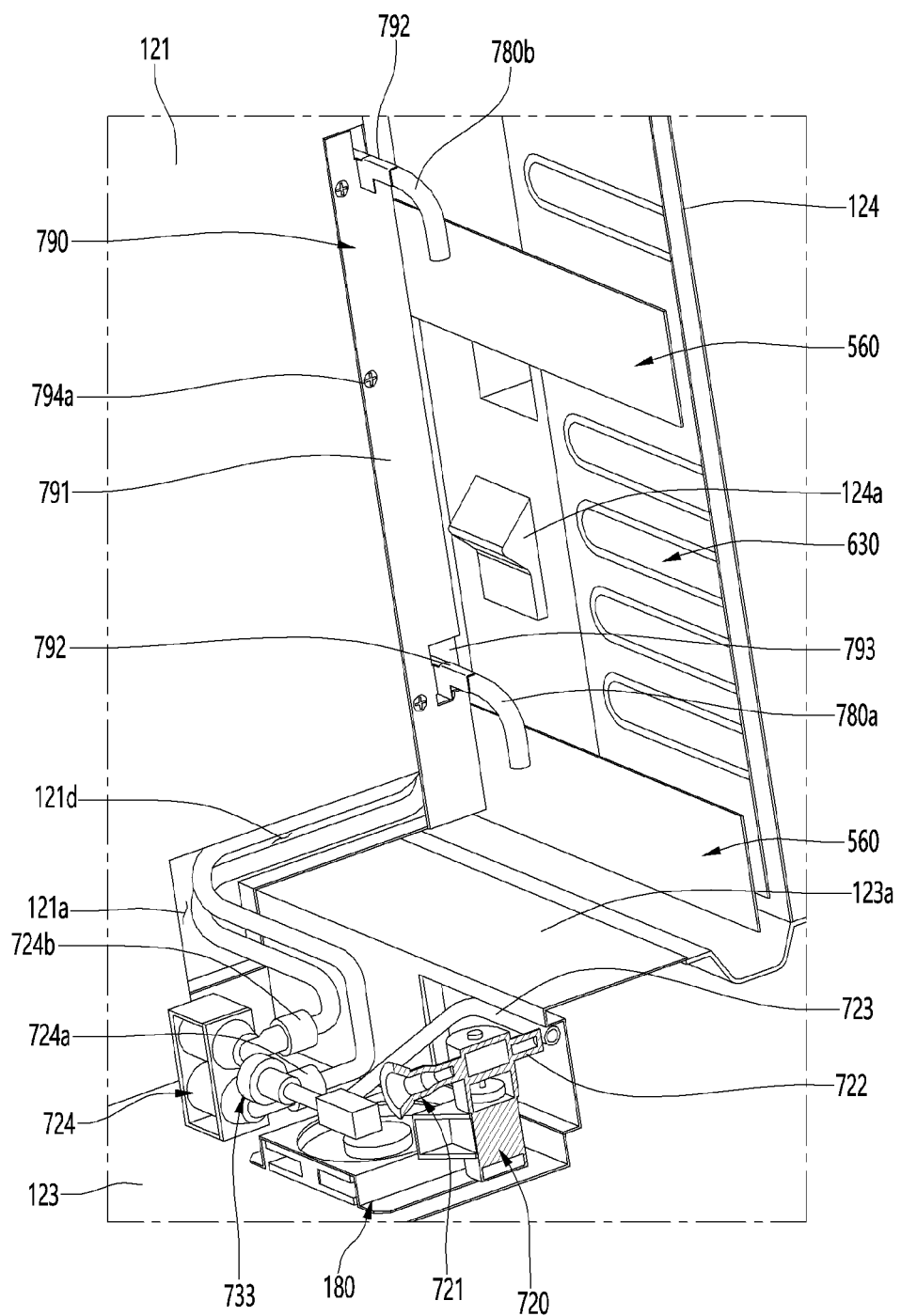
FIG. 17 is a perspective view illustrating a state where the water supply flow path is fixed.

FIG. 16 is a perspective view illustrating a state where a portion of an outer case of the cabinet is removed, and FIG. 17 is a perspective view illustrating a state where the water supply flow path is fixed.

As illustrated in the drawings, a pipe connection portion 721 and a water pump 720 are connected to each other on the inside of the pump cover 740, and the water pump 720 can be connected to a water supply valve 724 by a pipe 723. In addition, a water supply flow path 780 for supplying water to the bed 300 may be connected to the output side of the water supply valve 724.

When the pump cover 740 is mounted, the water pump 720 and the water supply valve 724 for supplying water and flow paths connected thereto may be shield. The pump cover 740 may shield the lower end of the pipe guide 121a recessed in the side surface of the inner case 120. The pipe guide 121a may be formed on the side plate 121 forming both side surfaces of the cultivation space 101 of the inner case 120. The pipe guide 121a may be formed to be recessed outwardly so that the water supply flow path 780 can be accommodated therein. For example, an opening 121b is formed in the side plate 121, and the pipe guide 121a formed in a shape corresponding to the outside of the opening 121b along the opening 121b may be coupled to each other. The inner case 120 may be formed of a metal material, and the pipe guide 121a may also be formed of the same material as the inner case 120. In addition, the outer surface of the pipe guide 121a may be embedded in the insulating material 102 between the outer case 110 and the inner case 120.

The pipe guide 121a may be formed in a size that can accommodate the water supply flow path 780, that is, the upper water supply pipe 780b and the lower water supply pipe 780a, and the upper water supply pipe 780b and the lower water supply pipe 780a may be disposed along the pipe guide 121a and extend to rear ends of the upper bed 300b and the lower bed 300a, respectively.

Since the pipe guide 121a is recessed from the inside to the outside of the cultivation space 101, interference by components disposed inside the cultivation space 101 may be prevented. In particular, it is possible to have a disposition structure that does not interfere with the beds 300 that are disposed to be capable of being introduced or withdrawn. In addition, it is possible to prevent the volume of the cultivation space 101 from being reduced.

Meanwhile, the lower surface of the cultivation space 101 may be formed by the lower surface plate 123 of the inner case 120, and the rear end of the lower surface plate 123 may have a stepped portion 123a to prevent interference with the compressor 610.

Meanwhile, an exhaust fan 180 may be provided on the bottom surface of the cultivation space 101, and a discharge duct 182 connecting the bottom surface of the cultivation space 101 and the top surface of the machine room 200 to discharge air in the cultivation space 101 may be provided at a position corresponding to the exhaust fan 180.

Hereinafter, a structure for ventilation of the cultivation space 101 will be described with reference to the drawings.

Figure 18:
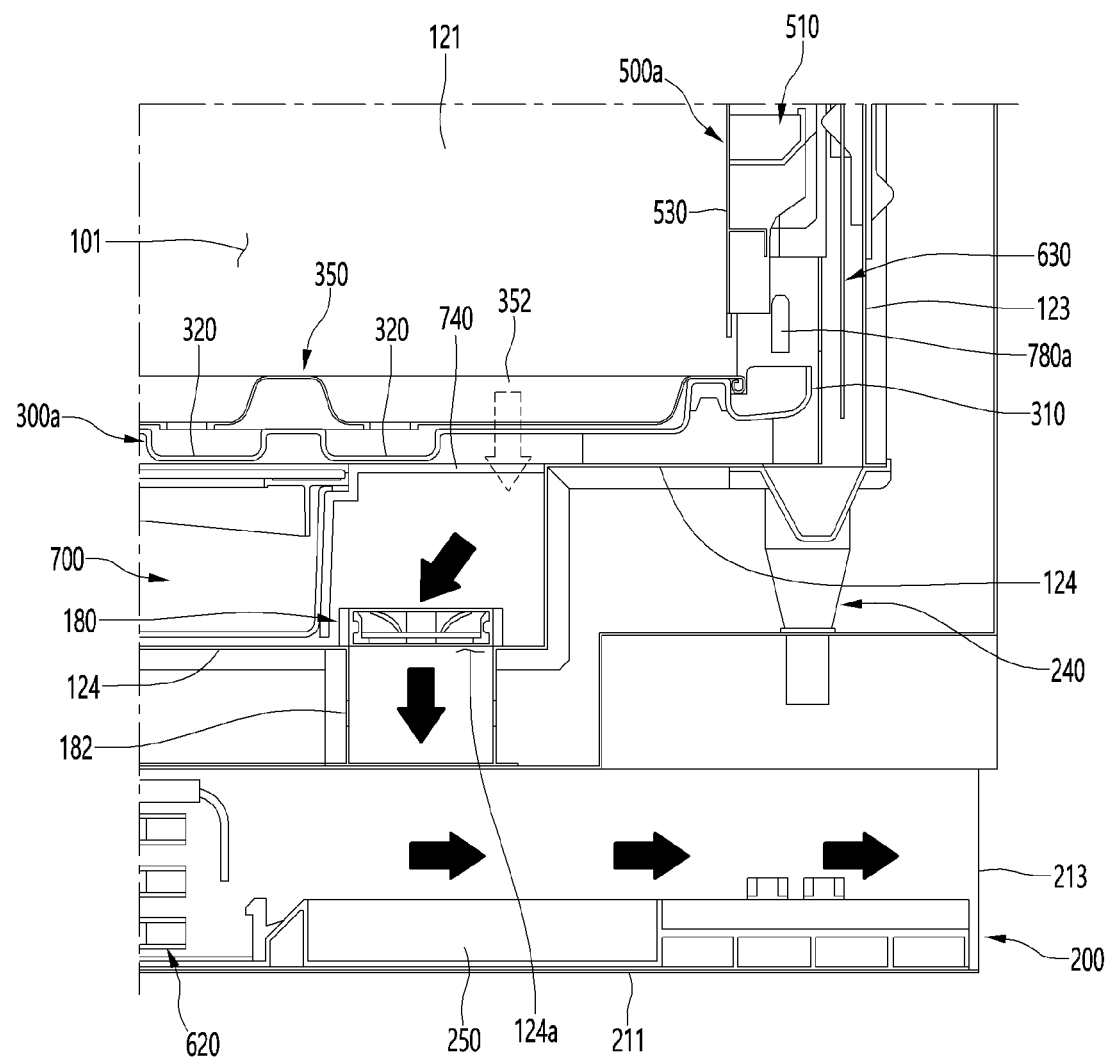
FIG. 18 is a cross-sectional view illustrating a structure of a discharge duct of the apparatus for cultivating plants.

FIG. 18 is a cross-sectional view illustrating a structure of a discharge duct of the apparatus for cultivating plants.

As illustrated in the drawing, an exhaust fan 180 may be provided under the pump cover 740. The exhaust fan 180 may allow the air in the cultivation space 101 to be discharged to the outside via the machine room 200 to ventilate the cultivation space 101. The exhaust fan 180 can be shielded by the pump cover 740 to prevent external exposure and is provided on the lower surface of the cultivation space 101 adjacent to the machine room 200 to allow exhaust to be made more smoothly.

In addition, the bottom surface of the cultivation space 101 and the upper surface of the machine room 200 may be connected by a discharge duct 182. The discharge duct 182 allows the air inside the cultivation space 101 to be discharged and may allow the cultivation space 101 and the machine room 200 to communicate with each other. In addition, the exhaust fan 180 may be connected to an inlet of the discharge duct 182.

The opened upper surface of the discharge duct 182, that is, the inlet of the discharge duct 182 may communicate with the cultivation space outlet 124a formed on the bottom surface of the cultivation space 101. In addition, the exhaust fan 180 may be provided at the cultivation space outlet 124a. Accordingly, when the exhaust fan 180 is driven, the air in the cultivation space 101 can be effectively discharged into the machine room 200 through the discharge duct 182.

At this time, the opened lower surface of the discharge duct 182, that is, the outlet of the discharge duct 182 is communicated with the upper surface of the machine room 200, and among the internal spaces of the machine room 200, the outlet of the discharge duct 182 may communicate with a space in which the condenser 620 is disposed.

In detail, the discharge duct 182 may communicate with the suction side of the heat dissipation fan 611, and when the heat dissipation fan 611 is driven, air in the inside of the discharge duct 182 by the suction force of the heat dissipation fan 611 can flow into the machine room 200 more effectively.

In addition, the air flowing into the machine room 200 through the heat dissipation fan 611 may be exhausted to the outside through the grill discharge port 222 of the grill cover 200 through the compressor 610. In other words, the air inside the cultivation space 101, whose humidity is increased due to the transpiration of plants, flows into the space between the pump covers 740 and the cultivation space 101 and moves downward, is discharged to the machine room 200 through the discharge duct 182, and then may be discharged to the outside via the machine room 200.

Meanwhile, the discharge duct 182 is formed in a cylindrical shape, the upper surface and the lower surface thereof may be opened. In addition, the opened upper surface of the discharge duct 182 may communicate with the bottom surface of the cultivation space 101, and the opened lower surface of the discharge duct 182 may communicate with the upper surface of the machine room 200. Accordingly, the discharge duct 182 connects the cultivation space 101 and the machine room 200 through the shortest path.

In addition, the discharge duct 182 may be embedded in the insulating material. Since the discharge duct 182 connects the cultivation space 101 and the machine room 200 through the shortest path, the non-insulated area not filled with the insulating material 102 is minimized, and the deterioration of the insulation performance of the cultivation space 101 can be prevented.

In addition, the discharge duct 182 may be formed in a cylindrical shape having a rectangular cross section by bending a plate-shaped metal material a plurality of times. In addition, flanges are formed around the opened upper end and lower end of the discharge duct 182 to be fixedly mounted on the bottom surface of the cultivation space 101 and the upper surface of the machine room 200. Of course, the discharge duct 182 may be formed in the same shape by injection of a plastic material.

Figure 19:
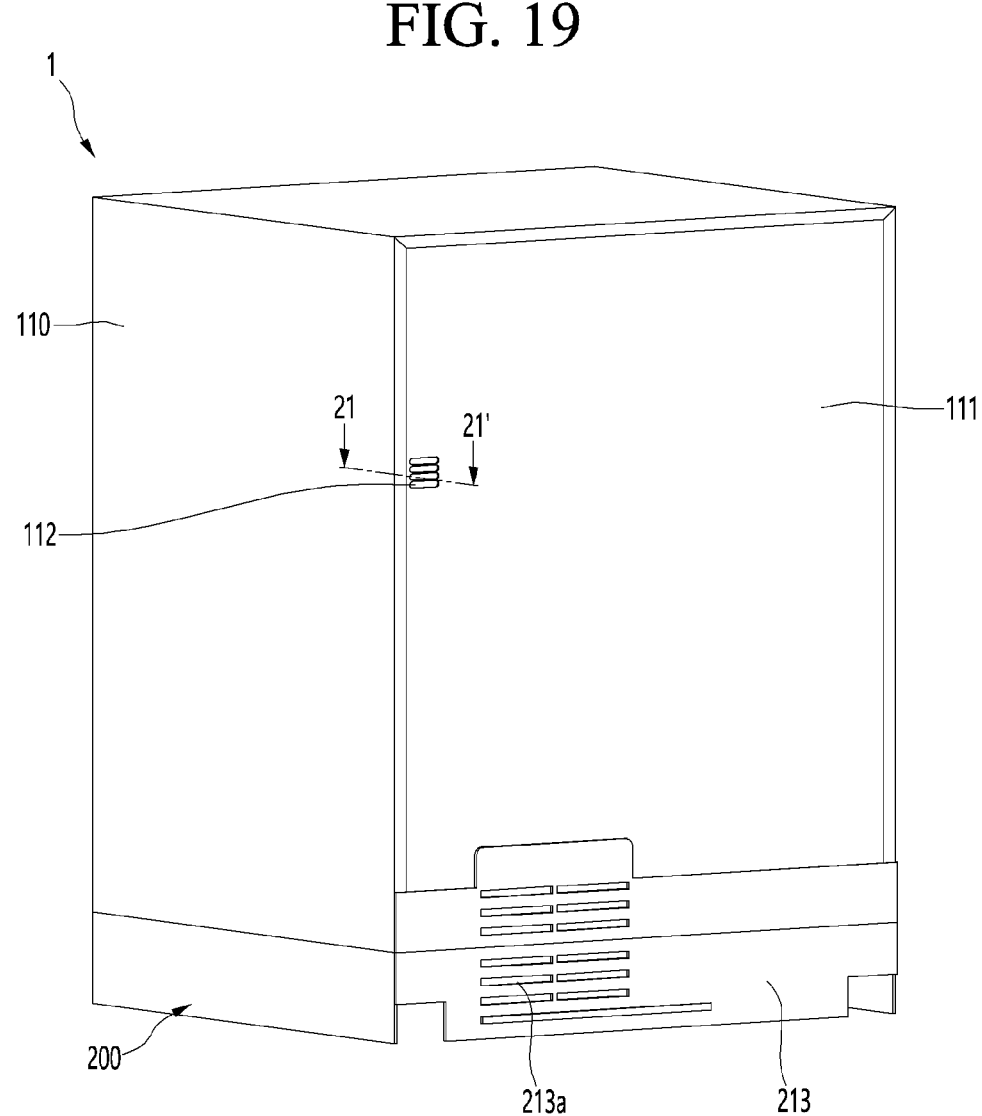
FIG. 19 is a perspective view illustrating the apparatus for cultivating plants viewed from the rear.
Figure 20:
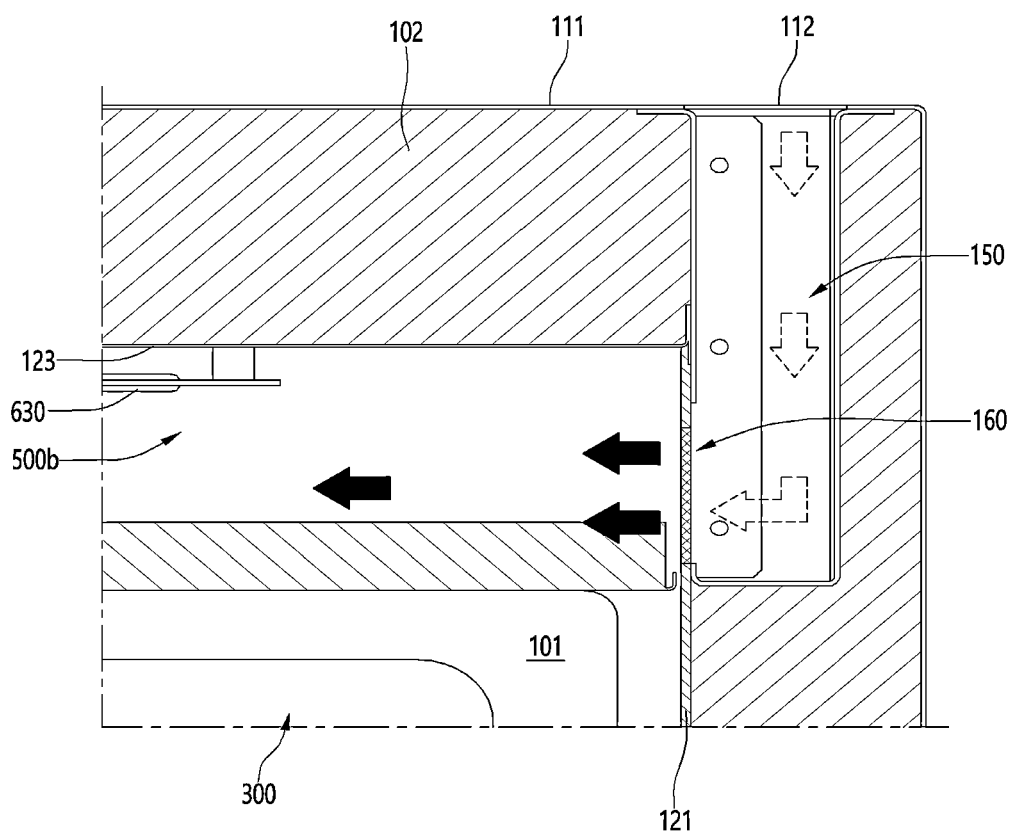
FIG. 20 is a cross-sectional view illustrating the structure of the suction duct of the apparatus for cultivating plants.
Figure 21:
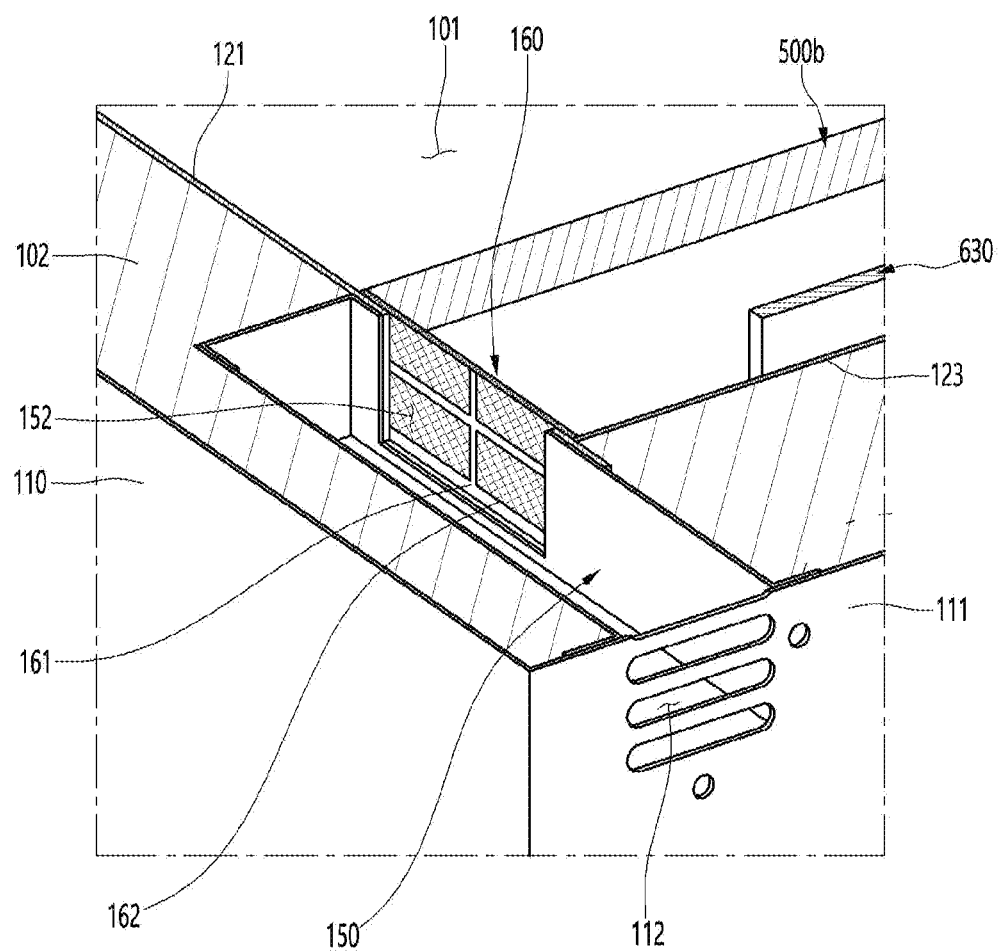
FIG. 21 is a perspective view viewed from the rear taken along line 21-21' of FIG. 19.
Figure 22:
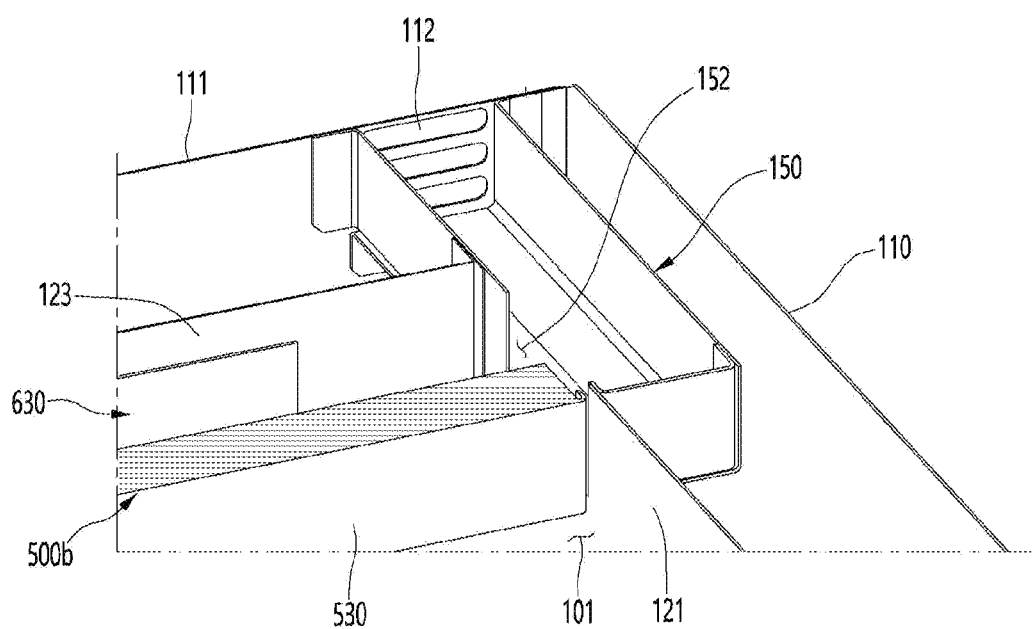
FIG. 22 is a perspective view viewed from the front taken along the line 21-21' of FIG. 19.
Figure 23:
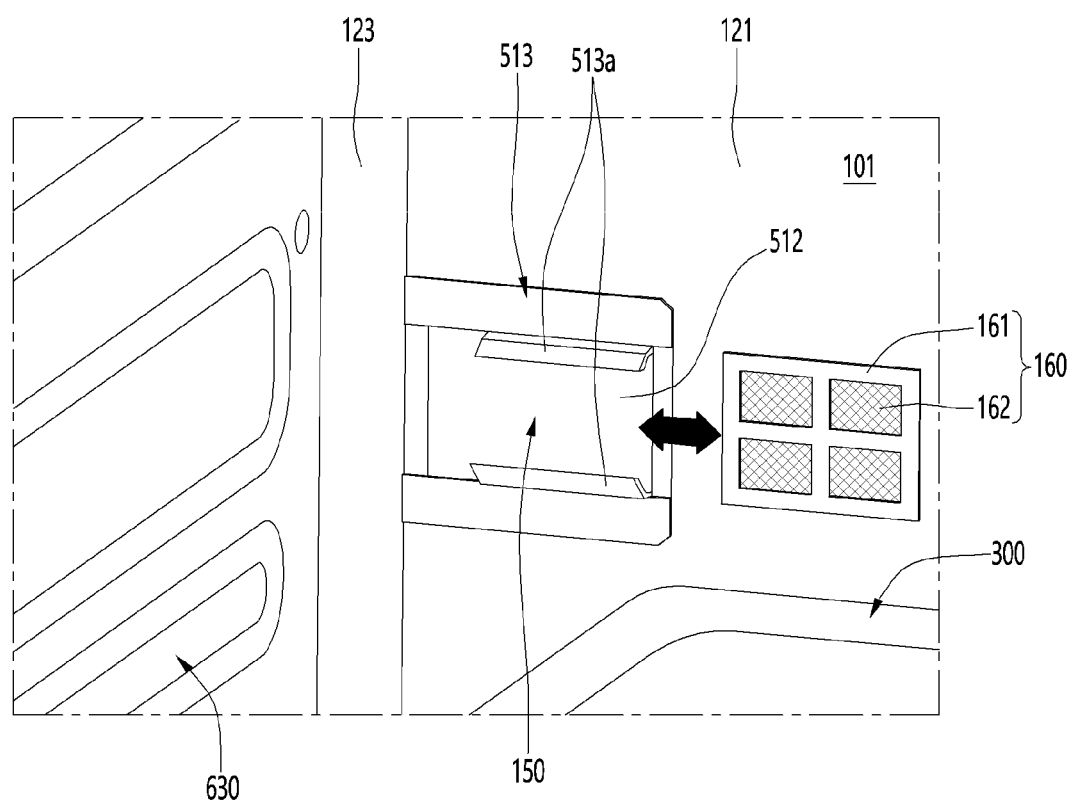
FIG. 23 is a view of the cultivation space inlet viewed from the inside of the cultivation space of the apparatus for cultivating plants.

FIG. 19 is a perspective view illustrating the apparatus for cultivating plants viewed from the rear, FIG. 20 is a cross-sectional view illustrating the structure of the suction duct of the apparatus for cultivating plants, FIG. 21 is a perspective view viewed from the rear taken along line 21-21' of FIG. 19, FIG. 22 is a perspective view viewed from the front taken along the line 21-21' of FIG. 19, and FIG. 23 is a view of the cultivation space inlet viewed from the inside of the cultivation space of the apparatus for cultivating plants.

As illustrated in the drawings, meanwhile, the upper portion of the cabinet 10 may be provided with a suction duct 150. The suction duct 150 may communicate with the inside and the outside spaces of the cultivation space 101 so that external air flows into the inside of the cultivation space 101 to supply carbon dioxide to the inside of the cultivation space 101.

The suction duct 150 may connect the back plate 111 provided on the rear surface of the cabinet 10 and the side plate 121 forming the side surface of the cultivation space 101. The suction duct 150 may be formed in a hexahedral cylindrical shape, and the opened rear surface of the suction duct 150, that is, the inlet of the suction duct 150, can be communicated with the plate grill 112 formed in the back plate 111. Accordingly, external air may flow into the suction duct 150 through the plate grill 112. In addition, the outlet of the suction duct 150 may be formed on a circumferential surface of the suction duct 150, that is, one side surface facing the side plate 121. The outlet of the suction duct 150 may be formed at one end of the suction duct 150 and may communicate with the cultivation space inlet 152.

As such, the suction duct 150 may be formed in a hexahedral cylindrical shape, and extend rearward in a state of being in contact with one side of the cultivation space 101, that is, the side plate 121 to be in contact with the back plate 111. Accordingly, the suction duct 150 can pass through the cabinet 10 through the shortest path.

In addition, the suction duct 150 may extend from the side of the cultivation space 101, that is, from the side of the side plate 121, and thus it is possible to prevent interference with components which is provided on the rear wall surface 213 of the cultivation space 101, particularly components such as the evaporator 630.

The suction duct 150 may be formed by bending a metal plate-shaped material a plurality of times and may be formed of a plastic material if necessary. In addition, the suction duct 150 may be disposed between the outer case 110 and the inner case 120 to be embedded by the insulating material 102.

Meanwhile, the suction duct 150 may extend to the front end of the blower assembly 500. In other words, at least a portion of the outlet of the suction duct 150 may be positioned more rearward than the front end of the blower assembly 500. Accordingly, the cultivation space inlet 152 corresponding to the outlet of the suction duct 182 may also be at least partially covered by the blower assembly 500, and the cultivation space inlet 152 can be prevented from being directly exposed into the cultivation space 101.

In addition, the cultivation space inlet 152 may overlap an area between the rear wall surface of the cultivation space 101 and the blower assembly 500. Accordingly, the air flowing into the cultivation space 101 through the cultivation space inlet 152 may flow backward of the blower fan 520 and be discharged forward by the blower fan 520.

In other words, the air flowing to the rear of the blower fan 520 may be cooled through the evaporator 630 or an area adjacent to the evaporator 630 and then discharged to the front. Accordingly, even if air from the external space flows into the cultivation space 101, the temperature of the cultivation space 101 is not rapidly changed.

Meanwhile, a pre-filter 160 may be provided at the inlet 152 of the cultivation space. The pre-filter 160 may prevent foreign substances such as dust or pests from entering from the outside. The pre-filter 160 may be sized to shield the inlet 152 of the cultivation space. The pre-filter 160 may include a filter frame 161 forming an overall outer frame and a filter portion 162 having a net structure or a mesh structure that covers the filter frame 161.

A filter guide 513 may be formed at the upper end and lower end of the cultivation space inlet 152. The filter guide 513 may extend along the upper end and lower end of the cultivation space inlet 152, and the accommodation portion 513a capable of accommodating the upper end and lower end of the pre-filter 160 may be bent. Accordingly, the pre-filter 160 may be moved in the front and rear direction along the filter guide 513 and may be detached from the inside of the cultivation space 101 if necessary.

In other words, the pre-filter 160 may be inserted and mounted inside the filter guide 513 and may be disposed in a gap between the side wall surface of the cultivation space 101 and the side surface of the blower assembly 500. In addition, when replacement or management of the pre-filter 160 is required, the pre-filter 160 may be introduced or withdrawn through between the side wall surface of the cultivation space 101 and the side surface of the blower assembly 500.

Meanwhile, the suction duct 150 may be disposed at a position corresponding to the height of the blower assembly 500b positioned at the uppermost of the blower assemblies 500. In other words, the suction duct 150 may be positioned in the upper area of the cultivation space 101, so that air suctioned into the cultivation space 101 from the outside flows thereinto through the upper portion of the cultivation space 101, and, since the air on the bottom surface of the cultivation space 101 is discharged to the outside through the machine room 200 through the discharge duct 182, the inside of the cultivation space 101 can be effectively ventilated.

Hereinafter, the structure of the bed 300 will be described in more detail with reference to the drawings. Even if a plurality of the beds 300 are provided, only one bed 300 will be described because a plurality of the beds 300 all have the same structure except for a different mounting position.

Figure 24:
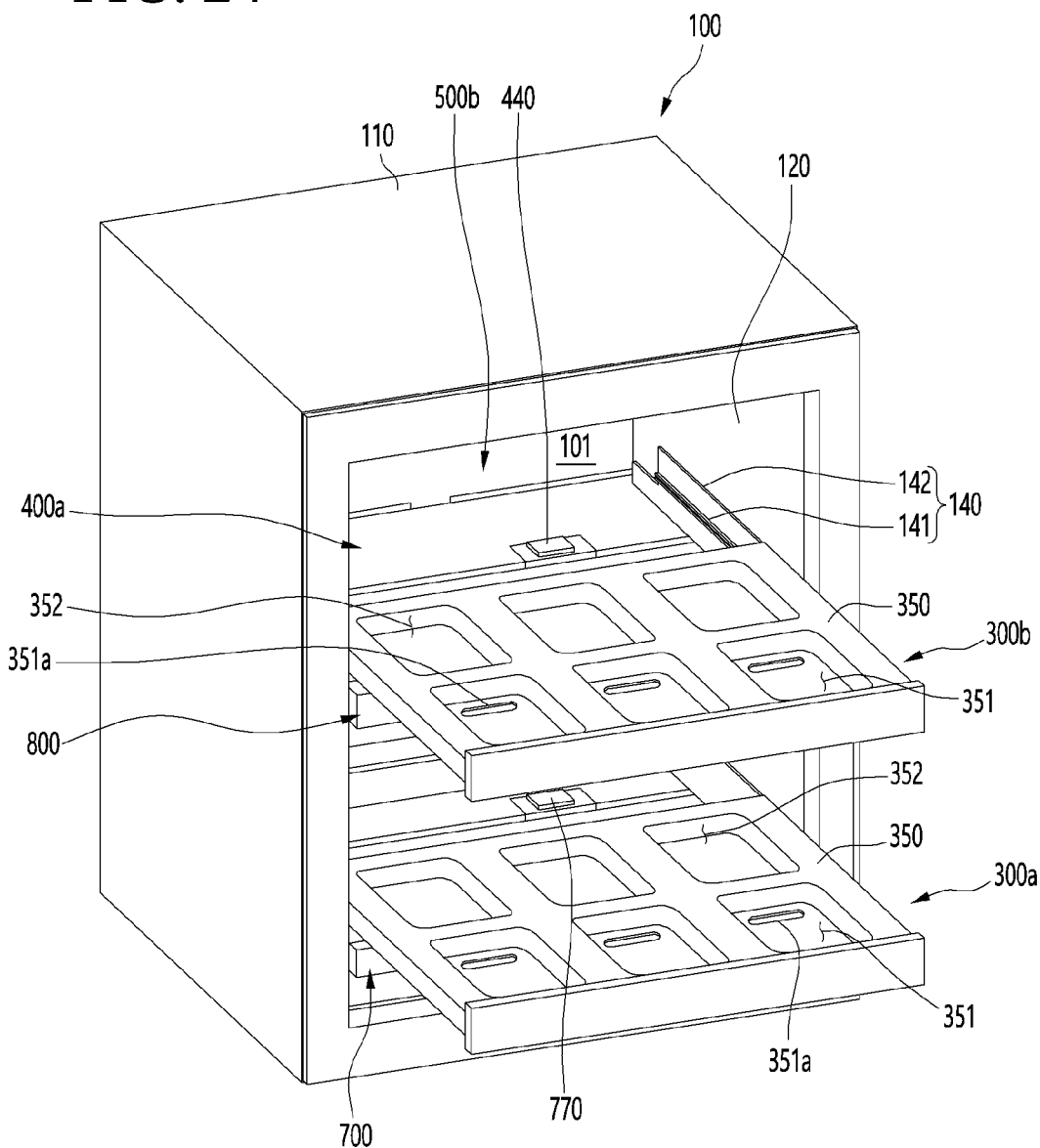
FIG. 24 is a perspective view illustrating a state where the bed of the apparatus for cultivating plants is withdrawn.
Figure 25:
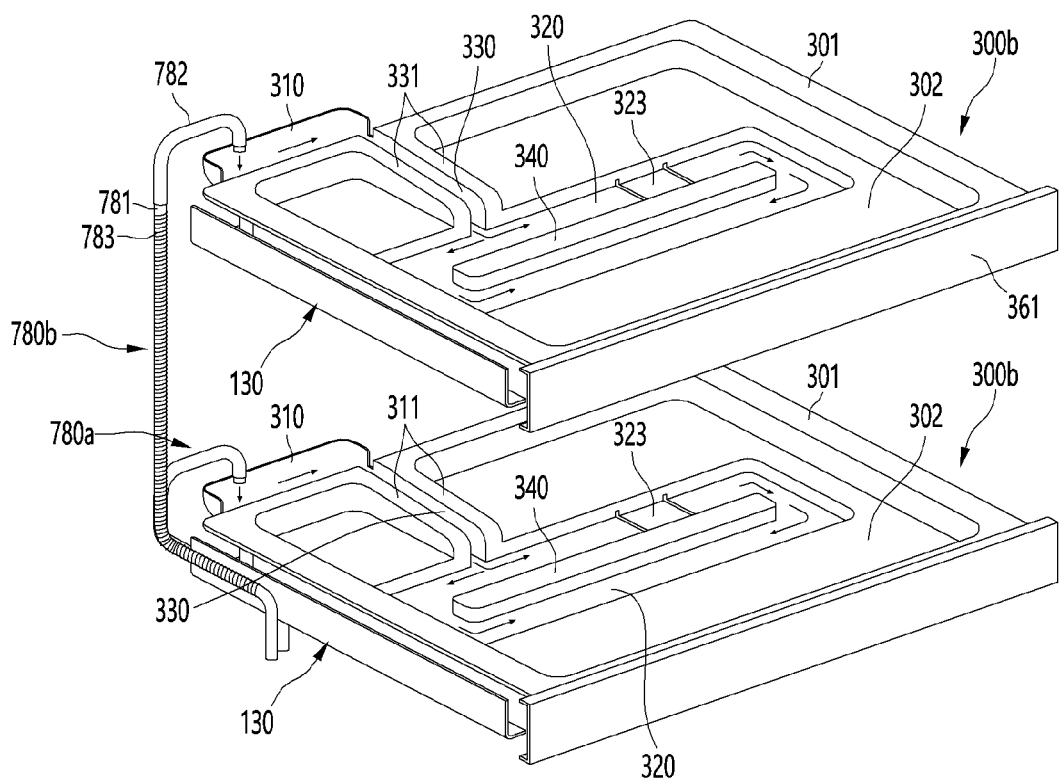
FIG. 25 is a perspective view illustrating a disposition relationship between the bed and the water supply flow path.
Figure 26:
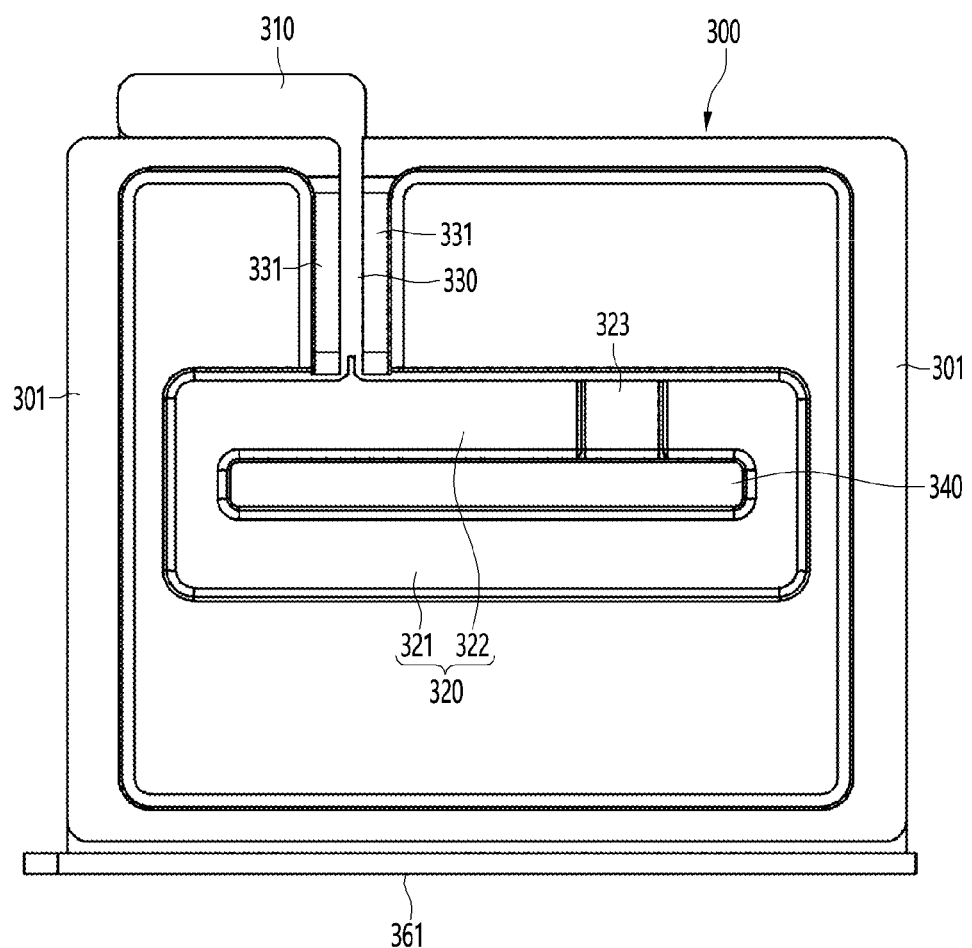
FIG. 26 is a plan view illustrating the bed.
Figure 27:
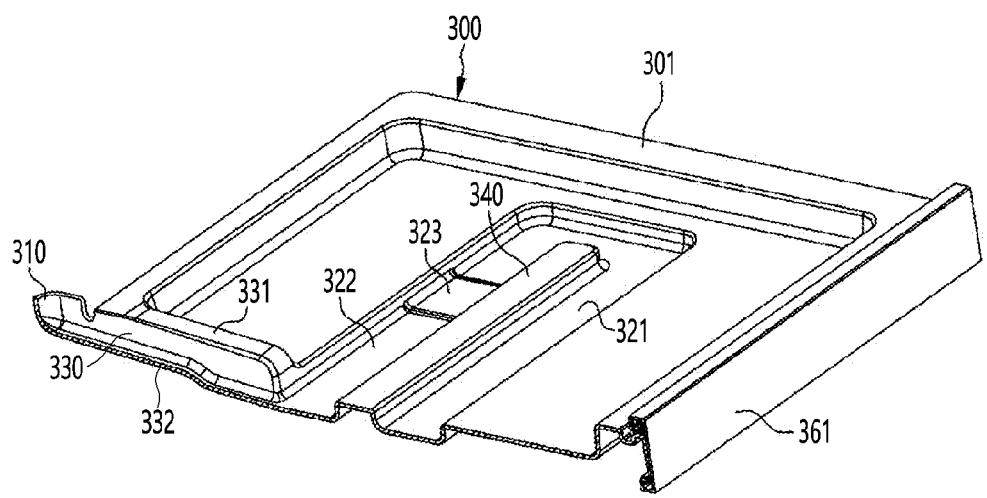
FIG. 27 is a cut-away perspective view illustrating the bed.

FIG. 24 is a perspective view illustrating a state where the bed of the apparatus for cultivating plants is withdrawn, FIG. 25 is a perspective view illustrating a disposition relationship between the bed and the water supply flow path, FIG. 26 is a plan view illustrating the bed, and FIG. 27 is a cut-away perspective view illustrating the bed.

As illustrated in the drawings, the bed 300 may be formed in a rectangular plate shape that partitions the cultivation space 101, and can be mounted to be introduced into/withdrawn from the cultivation space by the bed rail device 140 mounted on both sides of the cultivation space 101.

The bed rail device 140 may include a slidably extending bed rail 142 and a rail bracket 141 capable of fixing the bed rail 142 to both sides of the cultivation space 101. The bed rail 142 may have a structure extending in multiple stages and may connect between both side surfaces of the bed 300 in the left and right direction and the rail bracket 141.

The bed 300 may form a structure which is formed in a rectangular shape as a whole to provide a space in which a plurality of pods 10 are disposed and in which water supplied can be stored. In addition, the bed 300 may be formed of a plastic material to form a structure for guiding the flow of supplied water.

A bed flange 301 extending outwardly is formed around the bed 300. A bed tray 350 to be described below may be seated on the bed flange 301. In addition, the inner area of the bed flange 301 becomes an area in which the pod 10 can be disposed.

A recessed portion 302 is formed inside the bed flange 301, and the bed tray 350 may be seated in the recessed portion 302. The recessed portion 302 may be formed to accommodate the entire plurality of pod seating portions 352 formed in the bed tray 350. In addition, when the bed tray 350 is mounted, the upper surface of the bed 300 and the lower surface of the bed tray 350 may be in contact with each other and overlapped.

A water supply portion 310 may be formed at the rear end of the bed 300. The water supply portion 310 may be positioned at one end of both sides in the left and right direction and may be formed to protrude rearward from the rear end of the bed 300. In other words, the water supply portion 310 may be positioned vertically below the end portions of the water supply pipes 780a and 780b protruding from the side surface of the cultivation space 101.

The water supply portion 310 may be formed in a shape in which an upper surface is opened and a lower surface is recessed. The circumference of the water supply portion 310 protrudes to a predetermined height to prevent water supplied from the water supply pipes 780a and 780b from splashing or overflowing.

A water collection portion 320 in which water supplied through the water supply portion 310 is stored may be formed in the bed 300. In addition, a water guide 330 may be recessed between the water supply portion 310 and the water collection portion 320. In other words, the water guide 330 may connect the water supply portion 310 and the water collection portion 320, and the water supplied to the water supply portion 310 may be supplied to the water collection portion 320 along the water guide 330.

The water supply portion 310 is positioned higher than the water collection portion 320, and water from the water supply portion 310 may naturally flow into the water collection portion 320. In addition, the water guide 330 may be formed to have an inclination that gradually decreases from the water supply portion 310 toward the water collection portion 320. Accordingly, when water is supplied to the water supply portion 310, water may be naturally supplied to the water collection portion 320 along the water guide 330.

Meanwhile, guide walls 331 may be formed on both sides of the water guide 330 to form the water guide 330. The guide wall 331 may extend from the water supply portion 310 to the water collection portion 320, and a pair of the guide wall may be spaced apart from each other to form both side surfaces of the water guide 330. In addition, the guide wall 331 may be formed to have a height corresponding to the height of the bed flange 301 to support the bed tray 350 from below.

The water guided from the water supply portion 310 to the water collection portion 320 by the water guide 330 may be directed toward the water collection portion 320 without overflowing to the outside. In particular, the bottom surface of the water guide 330 may be inclined at a height higher than that of the water collection portion 320 by the guide wall 331 extending upward. In addition, even in a situation where the height difference between the water supply portion 310 and the water collection portion 320 is not large, the water supplied to the water supply portion 310 does not overflow and can be directed to the water collection portion 320, and can provide a path with sufficient space to be guided smoothly. In other words, it provides a structure in which the water of the water supply portion 310 can be stably supplied without excessively deepening the recessed depth of the water collection portion 320, thereby increase in the thickness of the bed 300 in the upper and lower direction can be prevented, and thereby the bed 300 can have a slim structure.

In addition, the guide wall 331 and the water guide 330 may extend between a pair of pod seating portions 352 recessed in the bed tray 350. Accordingly, the guide wall 331 can be prevented from interfering when the bed tray 350 is seated, and a space for water supply can be secured through the space between the adjacent pod seating portions 352.

Meanwhile, in the central area of the bed 300, a water collection portion 320 for storing water supplied to the pod 10 may be recessed. The water collection portion 320 is more recessed than the bottom surface of the recessed portion 302 formed around the water collection portion 320 so that water supplied to the water supply portion 310 is existed only in the water collection portion 320 area in a state of being stored.

In detail, the water collection portion 320 is positioned in the center of the bed 300 and may extend from the left end to the right end of the bed 300. In addition, the water collection portion 320 may be formed to have a predetermined width in the front and rear direction so that all of the seating portion openings 351a formed in the bed tray 350 can be accommodated.

In addition, a bed protrusion 340 protruding upward may be formed in the central portion of the bed 300. A height of the bed protrusion 340 may be the same as or higher than that of the recessed portion 302. The bed protrusion 340 may be positioned in the center of the water collection portion 320. Accordingly, the water collection portion 320 may have a closed loop shape, and water flowing thereinto through the water guide 330 may flow along the inside of the closed loop shape of water collection portion 320. In addition, in the area of the water collection portion 320, a portion positioned in front of the bed protrusion 340 may be referred to as a front water collection portion 321, and a portion positioned at the rear of the bed protrusion 340 may be referred to as a rear side a water collection portion 322.

In addition, a distance between the outer end of the water collection portion 320 and the bed protrusion 340 may be greater than the width of the seating portion opening 351a in the front and rear direction. Accordingly, when the bed tray 350 is seated, the seating portion opening 351a may be disposed along the water collection portion 320.

The widths of the front-side water collection portion 321 and the rear-side water collection portion 322 in the front and rear direction in which the seating portion opening 351a is positioned may be the same as or slightly larger than the width of the pod seating portion 352 in the front and rear direction and thus there is a structure in which an appropriate amount of water required for water supply to the pod 10 can be effectively supplied to the pod 10. In addition, unnecessary water is prevented from remaining in the water collection portion 320 for a long time to prevent contamination of the bed 300 and to always maintain the bed in a clean state.

Meanwhile, a detection portion 323 may be formed in an inner area of the water collection portion 320. The detection portion 323 may be formed at a position corresponding to the residual water detection device 742 positioned below. Accordingly, in a state where the bed 300 is fully introduced, the residual water detection device 742 may have a structure capable of being in close contact with the detection portion 323.

In this case, the detection portion 323 may have a shape that protrudes when viewed from above and is recessed when viewed from below. Accordingly, it is possible to prevent the residual water detection device 742 from interfering with the detection portion 323 in the process of introducing and withdrawing the bed 300, thereby preventing the occurrence of an obstacle in introducing and withdrawing the bed 300.

In addition, due to the structure of the protruding detection portion 323, water supplied to the detection portion 323 does not accumulate, and it is possible to accurately determine whether additional water supply is needed to the water collection portion 320.

A bed handle 361 may be formed on the front surface of the bed 300. The bed handle 361 may have a structure in which a lower surface is recessed so that a user can hold the bed handle at the time of introduction and withdrawal of the bed 300. In addition, the front surface of the bed handle 361 may be formed of the same material as the tank handle 711 or may be formed of a material of the same texture to have a sense of unity.

Meanwhile, the bed tray 350 is seated on the upper surface of the bed 300 and may form an outer appearance of an upper surface of the bed 300. The bed tray 350 may be formed of a metal material such as stainless to keep the outer appearance neat and hygienically managed.

The bed tray 350 is formed in a size capable of shielding the upper surface of the bed 300 and may be formed in a plate shape. Accordingly, in a state where the bed tray 350 is mounted on the bed 300, the upper surface of the bed 300 is formed.

In addition, a plurality of pod seating portions 352 on which the pods 10 are seated may be formed in the bed tray 350. The pod seating portion 352 is recessed in a shape corresponding to the pod 10 so that the pod 10 can be seated, and a plurality of pod seating portions 352 may be sequentially disposed. Accordingly, a plurality of the pods 10 may be disposed on the bed tray 350.

A plurality of the pod seating portions 352 may be disposed in the front half portion and the rear half portion based on the center and may be formed in the same size. In addition, a seating portion opening 351a may be formed in the pod seating portion 352. The seating portion opening 351a allows the pod protrusion 16 protruding from the lower surface of the pod 10 to pass through, and allows the pod protrusion 16 to be in contact with the water inside the water collection portion 320.

The seating portion opening 351a may be formed for each of the pod seating portions 352. In addition, the seating portion openings 351a respectively formed in the plurality of pod seating portions 352 may be disposed along an area corresponding to the water collection portion 320.

In detail, when the bed tray 350 is seated on the bed 300, the seating portion opening 351a is positioned on the water collection portion 320 so that water stored in the water collection portion 320 can be supplied to the pod 10 through the seating portion opening 351a.

In this embodiment, the water collection portion 320 is disposed in the horizontal direction in the center of the bed 300, so that the seating portion openings 351a may be also formed in a position close to the center side of the bed tray 350 to be positioned on the upper side corresponding to the inside of the water collection portion 320. In more detail, all of the seating portion openings 351a formed in the pod seating portion 352 disposed in front of the bed 300 are positioned adjacent to the rear end of the pod seating portion 352, and all the seating portion openings 351a formed in the pod seating portion 352 disposed at the rear of the bed 300 may be positioned adjacent to the front end of the pod seating portion 352. In other words, the seating portion openings 351a may be continuously disposed along the inner area of the water collection portion 320.

Hereinafter, a structure in which the water of the water collection portion 320 is supplied to the pod 10 will be described in more detail with reference to the drawings.

Figure 28:
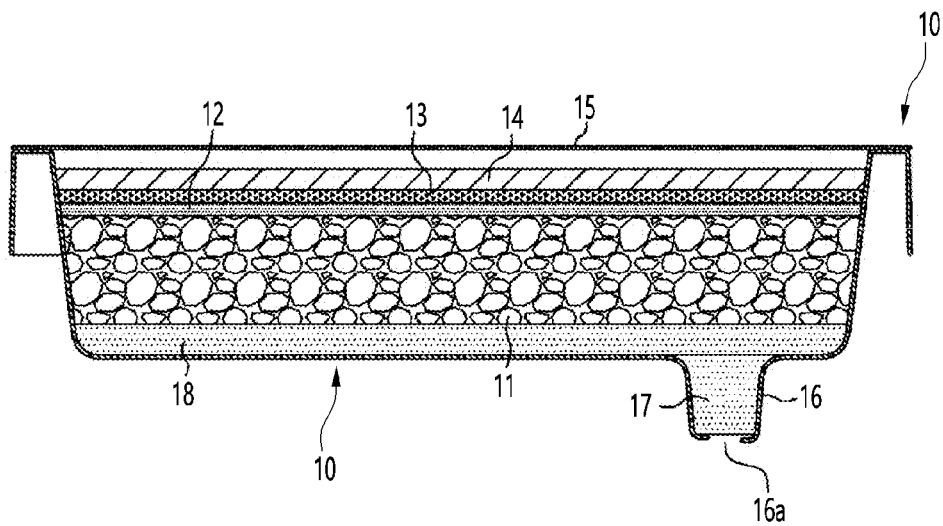
FIG. 28 is a cross-sectional view illustrating a pod seated on the apparatus for cultivating plants.
Figure 29:
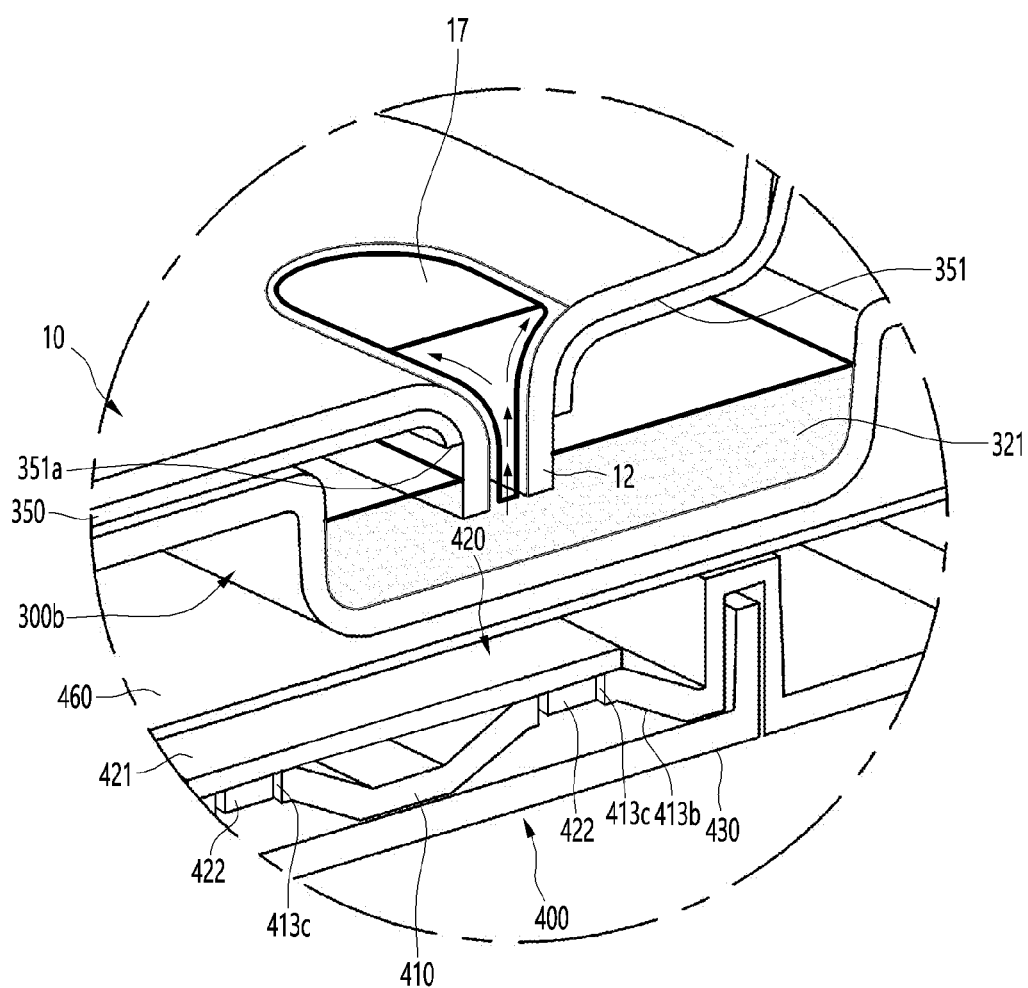
FIG. 29 is an enlarged view illustrating part "C" of FIG. 4.

FIG. 28 is a cross-sectional view illustrating a pod seated on the apparatus for cultivating plants, and FIG. 29 is an enlarged view illustrating part "C" of FIG. 4.

As illustrated, the pod 10 may be configured by types of plants that can be cultivated with the apparatus for cultivating plants 1. Of course, each of the pods 10 composed of several types of plants may all have the same size and may have a size set to be accommodated in the pod seating portion 352. Accordingly, the user can select the pod 10 of the plant desired to be cultivated and seat the pod at a desired position on the bed 300 to start cultivation.

In detail, the pod 10 may have an outer shape formed by a container opened upward. Top soil 11 containing a nutrient solution material (not illustrated) is filled in the pod 10. The nutrient solution material is a material containing nutrients supplied to plants to grow better. Such a nutrient solution material may be provided in the form of a water-soluble capsule that is gradually dissolved in water and may be configured to be contained in the feed water while gradually dissolving each time the feed water is supplied.

A seed paper 12 is provided on the upper surface of the top soil 11. The seed paper 12 may be composed of a sheet in which seeds are disposed to have a predetermined arrangement. When feed water is supplied in a state where the seed paper 12 is seated on the upper surface of the top soil 11, the seed paper 12 melts and disappears, and the seeds remain in the top soil 11.

A brick 13 is provided on the upper surface of the seed paper 12. The brick 13 is configured to adjust the moisture and humidity of the soil and prevent the formation of mold, and is made by processing inorganic ore such as vermiculite into a powder state and then pressing the powder state of the inorganic ore.

In addition, the upper surface of the pod 10 is covered with a protective paper 15 to protect the inside thereof. In particular, a packing member 14 is further provided between the upper surface of the brick 13 and the protective paper 15 to protect the brick 13 from the external environment. In addition, the type of plant to be cultivated may be printed on the protective paper 15 to provide information about the pod to the user.

Meanwhile, a protrusion 16 protruding downward is formed on the bottom surface of the pod 10, and a water-through hole 16a may be formed on the bottom surface of the protrusion 16. The protrusion 16 may be formed in a pipe structure with an empty inside while being opened up and down.

A first absorbing member 17 for absorbing water supplied to the beds 300a and 300b may be provided in the protrusion 16, and a second absorbing member 18 having a flat plate shape may be provided between the first absorbing member 17 and the top soil. The second absorbing member 18 functions to evenly supply the feed water absorbed by the first absorbing member 17 to the entire area of the top soil 11.

As illustrated in FIG. 29, when the pod 10 is seated on the pod seating portion 352, the pod protrusion 16 may protrude downward through the seating portion opening 351a. At this time, the pod protrusion 16 is positioned inside the water collection portion 320, that is, the front water collection portion 321.

When water is supplied to the inside of the water collection portion 320 in this state, the pod protrusion 16 can come into contact with the water inside the water collection portion 320. In addition, the water of the water collection portion 320 may flow thereinto through the water-through hole 16a, and along the first absorbing member 17 and the second absorbing member 18 inside the pod protrusion 16, water may be absorbed. In addition, the water absorbed through the first absorbing member 17 and the second absorbing member 18 may be uniformly supplied to the top soil of the pod 10.

Hereinafter, an operation of the apparatus for cultivating plants 1 according to an embodiment of the present disclosure having the above structure will be described.

The user selects a plant to be cultivated, removes the protective paper of the corresponding pod, and then seats the plant on the bed. When the pod 10 is seated on the bed 300, a predetermined amount of water stored in the water tank 700 is supplied to the bed 300.

At this time, the amount of water supplied is a set amount and may be slightly less than the amount to be sufficiently supplied to the pod 10. Accordingly, the supplied water may be absorbed from the water collection portion 320 to the pod 10, and when a predetermined time elapses, the supplied water is completely absorbed so that no water remains in the water collection portion 320.

When the residual water detection device 742 detects that there is no water in the water collection portion 320, the residual water detection device 742 supplies again the predetermined amount of water and again detects that there is no water left in the water collection portion 320, the controller 90 detects the time at this time and thus determines whether the set time has elapsed.

While repeating this process, the predetermined amount of water is continuously supplied and the time taken to be absorbed by the pod 10 is measured. If the time for which no water remains in the water collection portion 320 after water supply has elapsed for a set time, it is determined that sufficient water has been supplied and the water supply is stopped for a certain period of time. In addition, when the conditions for supplying water again are satisfied, water-supply is started again.

Accordingly, the water collection portion 320 does not maintain a state of being accommodated for a long time, and the amount of water required for plant growth can be supplied in a timely manner. In addition, nutrients necessary for plant growth are supplied in the form of a nutrient solution contained in the pod 10 so that the plants inside the pod 10 can grow effectively.

Meanwhile, light is irradiated toward the plant growing in the bed 300 by the operation of the light assembly 400. The light assembly 400 may be turned on and off at an appropriate time period according to the growth state and environment of the plant. In particular, by turning the light assembly 400 on and off according to the actual amount of sunlight according to the season, it is possible to provide an environment similar to that in which plants inside the apparatus for cultivating plants 1 grow in an external natural environment.

Plants in the bed 300 perform photosynthesis by the light provided by the light assembly 400, and carbon dioxide necessary for this process may be supplied through the air flowing into the cultivation space.

Meanwhile, in a case where the temperature inside the cultivation space 101 is too low, the heater is driven, and in a case where the temperature inside the cultivation space 101 is too high, the refrigeration cycle is driven and the evaporator 630 performs a cooling action.

Air heated or cooled by the heater or evaporator 630 is discharged forward through the blower assembly 500. At this time, air flows from the rear end of the light assembly 400 to the front, and the lower surface of the light assembly 400 is cooled during the air flow process.

Then, the air moved forward is moved downward and then flows from the front end of the bed 300 to the rear end of the bed 300. Stems and leaves of plants grown in the bed 300 are shaken by the flow of air flowing from the upper surface of the bed 300, so that the state of the cultivated plants can be remarkably improved.

The air flowing into the rear end of the bed 300 passes through again the space in which the evaporator 630 and the heater are disposed and may be discharged toward the light assembly 400 by the blower fan 520.

The air flowing by the operation of the blower fan 520 circulates inside the cultivation space 101, and continuously air-cools the light assembly 400 during the circulation process and facilitates the growth of food in the bed 300.

In addition, by continuously and uniformly heating and cooling the inside of the cultivation space 101 through a repeated air circulation process, the entire cultivation space 101 may maintain a set temperature.

Then, external air is suctioned in by the suction duct 150, and air inside the cultivation space 101 is discharged by the discharge duct 182. Accordingly, carbon dioxide necessary for plant growth may be supplied to the inside of the cultivation space 101 by the air suctioned in by the suction duct 150. In addition, humid air inside the cultivation space 101 is discharged by the discharge duct 182 to be ventilated, and condensation inside the cultivation space 101 can be prevented and proper humidity can be maintained.

Meanwhile, the operation of the exhaust fan 180 may be controlled to adjust the ventilation inside the cultivation space 101, and the exhaust fan 180 can be turned on and off according to the sensed humidity, carbon dioxide concentration, or preset time conditions in the refrigerator.

The user can check the state inside the cultivation space 101 through the door 130, and when the plants in the cultivation space 101 reach a harvestable state, the plants are harvested. In addition, if plant management is necessary before harvest, an appropriate operation is performed, and unnecessary crops may be discarded or the harvested pod 10 may be removed.

This harvesting and management operation may be performed by a user along the guidance through the display assembly 800, or information may be transmitted to a device carried by the user to guide the user's harvesting and management operation.

INDUSTRIAL APPLICABILITY

The apparatus for cultivating plants according to an embodiment of the present disclosure has high industrial applicability because hygiene is improved.

The invention claimed is:
1. An apparatus for cultivating plants, comprising:
a cabinet including an outer case forming an outer appearance of the cabinet, an inner case forming a cultivation space, and an insulating material disposed in a space defined between the inner case and the outer case;
a door connected to the cabinet to open and close the cultivation space;
at least one bed disposed in the cultivation space;
at least one blower assembly that circulates air in the cultivation space; and
a machine room disposed below the cultivation space and separated therefrom and configured to contain components of a refrigeration cycle that adjusts a temperature of the cultivation space;
a discharge outlet to discharge air inside of the machine room;
a discharge duct through which the cultivation space and the machine room communicate; and
a suction duct disposed between the outer case and the inner case and passing through the insulating material, wherein an inlet of the suction duct is formed at a back plate defining a rear surface of the outer case, and an outlet of the suction duct is formed at a side plate defining a side surface of the inner case, wherein air is drawn into the cultivation space from outside of the cabinet through the inlet of the suction duct, circulates within the cultivation space via the at least one blower assembly, flows into the machine room through the discharge duct, and then is discharged, after passing through the machine room, outside of the cabinet through the discharge outlet.

2. The apparatus for cultivating plants according to claim 1, wherein the inlet of the suction duct is disposed at an upper portion of the back plate.

3. The apparatus for cultivating plants according to claim 2, wherein the back plate comprises a plate grill formed at the inlet of the suction duct.

4. The apparatus for cultivating plants according to claim 1, wherein the suction duct connects the back plate and the side plate.

5. The apparatus for cultivating plants according to claim 1, wherein the suction duct extends to and communicates with the at least one blower assembly.

6. The apparatus for cultivating plants according to claim 1, wherein the outlet of the suction duct is partially covered by the at least one blower assembly.

7. The apparatus for cultivating plants according to claim 1, wherein at least a portion of the outlet of the suction duct is positioned further rearward than the at least one blower assembly.

8. The apparatus for cultivating plants according to claim 1, wherein the outlet of the suction duct corresponds to an inlet of the cultivation space, which overlaps an area between a rear plate defining a rear surface of the inner case and the at least one blower assembly.

9. The apparatus for cultivating plants according to claim 1, further comprising a filter disposed at the outlet of the suction duct.

10. The apparatus for cultivating plants according to claim 1, wherein the discharge outlet is disposed at a lower portion of the back plate adjacent the machine room.

11. The apparatus for cultivating plants according to claim 1, wherein the discharge outlet comprises a plate grill formed in the back plate.

12. The apparatus for cultivating plants according to claim 1, wherein an inlet of the discharge duct communicates with the cultivation space and an outlet of the discharge duct communicates with the machine room.

13. The apparatus for cultivating plants according to claim 12, further comprising an exhaust fan disposed adjacent the inlet of the discharge duct.

14. The apparatus for cultivating plants according to claim 12, wherein the outlet of the discharge duct communicates with a condenser disposed in the machine room.

15. The apparatus for cultivating plants according to claim 1, wherein the refrigeration cycle comprises an evaporator disposed at a rear portion of the cultivation space, and a compressor and a condenser disposed in the machine room.

16. An apparatus for cultivating plants, comprising:
a cabinet including an outer case forming an outer appearance of the cabinet, an inner case forming a cultivation space, and an insulating material disposed in a space defined between the inner case and the outer case;
a door connected to the cabinet to open and close the cultivation space;
at least one bed disposed in the cultivation space;
at least one blower assembly that circulates air in the cultivation space;
a suction duct disposed between the outer case and the inner case and passing through the insulating material, wherein an inlet of the suction duct is formed at a back plate defining a rear surface of the outer case, and an outlet of the suction duct is formed at a side plate defining a side surface of the inner case;
a machine room disposed below the cultivation space and separated therefrom and configured to contain components of a refrigeration cycle that adjusts a temperature of the cultivation space, wherein a discharge outlet is disposed at a lower portion of the cabinet adjacent the machine room; and
a discharge duct through which the cultivation space and the machine room communicate, wherein air is drawn into the cultivation space from outside of the cabinet through the suction duct, circulates within the cultivation space via the at least one blower assembly, flows into the machine room through the discharge duct, and then is discharged, after passing through the machine room, outside of the cabinet through the discharge outlet.

* * * * *